United States Patent
Toyoda et al.

(10) Patent No.: US 11,096,398 B2
(45) Date of Patent: Aug. 24, 2021

(54) GAS DISPERSAL PROCESS FOR SPRAY-DRYING A LIQUID AND SOLIDS MADE THEREFROM

(71) Applicant: Meiji Co., Ltd., Tokyo (JP)

(72) Inventors: Ikuru Toyoda, Kanagawa (JP); Yoshinori Satake, Kanagawa (JP); Kazumitsu Ohtsubo, Kanagawa (JP)

(73) Assignee: Meiji Co., Ltd., Tokyo (JP)

( * ) Notice: Subject to any disclaimer, the term of this patent is extended or adjusted under 35 U.S.C. 154(b) by 55 days.

(21) Appl. No.: 16/562,010

(22) Filed: Sep. 5, 2019

(65) Prior Publication Data

US 2020/0060303 A1 Feb. 27, 2020

Related U.S. Application Data

(63) Continuation of application No. 13/133,974, filed as application No. PCT/JP2009/007289 on Dec. 25, 2009, now abandoned.

(30) Foreign Application Priority Data

Dec. 26, 2008 (JP) .................. 2008-335154

(51) Int. Cl.
*A23C 9/18* (2006.01)
(52) U.S. Cl.
CPC ..................... *A23C 9/18* (2013.01)
(58) Field of Classification Search
CPC .................. A23C 9/18; A23C 9/16
USPC ........................................ 426/588
See application file for complete search history.

(56) References Cited

U.S. PATENT DOCUMENTS

| 2,788,276 | A | * | 4/1957 | Reich | ................ | B01D 1/18 |
| | | | | | | 426/470 |
| 2005/0008752 | A1 | * | 1/2005 | Charman | .......... | A23C 9/15 |
| | | | | | | 426/590 |
| 2008/0292770 | A1 | * | 11/2008 | Shibata | ............ | A23C 9/16 |
| | | | | | | 426/588 |

OTHER PUBLICATIONS

Hanrahan, F.P., Tamsma, A., Fox, K. and Pallansch, M., "Production and Properties of Spray-Dried Whole Milk Foam," Journal of Dairy Science, vol. 45, No. 27,1962, pp. 27-31 (Year: 1962).*
Jones, A., "Density of Milk," available as of Aug. 19, 2002 at http://web.archive.org/web/20020819203748/http://hypertextbook.com/facts/2002/AliciaNoelleJones.shtml (Year: 2002).*

* cited by examiner

*Primary Examiner* — Jeffrey P Mornhinweg
(74) *Attorney, Agent, or Firm* — Osha Bergman Wantanabe & Burton LLP

(57) ABSTRACT

The object of the present invention is to provide a method for manufacturing solid milk having suitable hardness for practical use by manufacturing powdered milk having good compaction moldability.

In the manufacturing method of solid milk of the present invention, powdered milk for manufacturing solid milk is produced (S100), and then solid milk is produced by produced powdered milk. This manufacturing process (S100) comprises a gas dispersal process (S112) and a spray drying process (S114). In the gas dispersal process (S112), a prescribed gas is dispersed into liquid milk which is an ingredient of the powdered milk. In the spray drying process (S114), the liquid milk having a dispersed prescribed gas is sprayed, and the sprayed liquid milk is dried. By performing these processes, powdered milk is obtained. Solid milk is manufactured by solidifying the powdered milk.

10 Claims, 8 Drawing Sheets

GAS DISPERSAL PROCESS FOR SPRAY-DRYING A LIQUID AND SOLIDS MADE THEREFROM

CROSS REFERENCE TO RELATED APPLICATIONS

This application is a continuation of U.S. patent application Ser. No. 13/133,974, filed on Jun. 10, 2011, which is a National Stage of International Application No. PCT/JP2009/007289, filed on Dec. 25, 2009, which claims the priority of Japanese Patent Application No. 2008-335154, filed on Dec. 26, 2008. This application claims the benefit and priority of these prior applications and incorporates their disclosures by reference in their entirety.

TECHNICAL FIELD

The present invention relates to a method for the manufacturing of solid milk with suitable strength and solubility which can maintain the shape of solid milk at the time of manufacturing of the compaction molded body of powdered milk by using powdered milk which is manufactured by dispersing a prescribed gas, and to such solid milk.

BACKGROUND ART

Powdered milk is a powdered product (solid) which is manufactured by removing water from milk. However, the powdered milk is easily scattered so that it takes time to weigh the powdered milk (that is a low measurement). Accordingly, it is suggested that solid milk made of solidified powdered milk by compaction molding the powdered milk is manufactured to enhance the measurement (for example, see a following Patent Document 1 (Japanese Patent Publication No. 4062357)).

However, the problem is that the solid milk is inferior to the powdered milk in solubility due to a small surface area and a low porosity. On the other hand, if a compaction pressure is low at the time of compaction molding the powdered milk, hardness of the manufactured solid milk decreases and the solid milk is easily destroyed. Therefore, the problem is that it is difficult to enhance the solubility of the solid milk and still keep the hardness of the solid milk within the range of the utility.

In the Japanese Patent Publication No. 4062357 (Patent Document 1), a method of manufacturing solid milk which has both suitable hardness and suitable solubility under various controls or regulations in a step of manufacturing the solid milk from powdered milk is disclosed. However, it is not easy to control or regulate various things in the step of manufacturing the solid milk. So, it is considered that it is because necessity for various controls or regulations in a step of manufacturing the solid milk from powdered milk would be decreased if suitable powdered milk for manufacturing solid milk can be produced (specifically, a product which has good compaction moldability, namely a product for manufacturing solid milk having both suitable hardness and porosity).

By the way, when solid milk is manufactured by using powdered milk which is produced or prepared, the solid milk which has specific shape is transported in a factory. Especially, in solid milk before the final process (specifically, compaction molded body of powdered milk), hardness is not enough to keep a shape when transporting by a conveyer belt. As a result of that, the shape (size or weight etc) of solid milk which is finally obtained may not be uniform.

Patent Document 1 Japanese Patent Publication No. 4062357

DISCLOSURE OF THE INVENTION

Problems to be Solved by the Invention

It is an object of the present invention to provide a method of manufacturing solid milk which can keep shape during transporting the solid milk during production (specifically the compaction molded body of powdered milk) in a factory, and a method of manufacturing solid milk having suitable hardness and solubility for practical use.

Means for Solving Problems

The present invention, basically, disperses the prescribed gas in liquid milk before spray drying the liquid milk. Powdered milk obtained in this way is bulky (the volume grows) compared with powdered milk without dispersing the gas. And, the present invention is based on the knowledge that solid milk with a certain level of hardness is easily produced by simply compaction molding this powdered milk.

As demonstrated by Examples, compared with powdered milk without dispersing the gas, even though the powdered milk is produced easily in this way, hardness of the compaction molded body of powdered milk is increased, and still keeps the same degree of porosity. Specifically, when using abovementioned powdered milk, solid milk with high degree of hardness is obtained although compaction pressure is low at the time of compaction molding. This brought suitable degree of hardness for practical use in which compaction molded body of powdered milk does not crumble (not lose its shape) at the time of compaction molding (for example, 6 N to 22 N). Furthermore, the solid milk with suitable porosity for practical use (for example, 44 percents to 55 percents) a final product could be produced. Namely, as noted above, powdered milk which can be solidified at a low compaction pressure is suitable for reproducing solid milk with both suitable degree of hardness and solubility for practical use. In addition, in case of transporting the compaction molded body of powdered milk from a compaction molding process to a humidification process, solid milk as a final product can also keep good silhouette since hardness of compaction molded body of powdered milk is increased.

Particularly, the prescribed gas the volume of which is $1 \times 10^{-2}$ times to 7 times the volume of liquid milk is dispersed in liquid milk, and then powdered milk having abovementioned characteristics was effectively obtained.

Besides, when obtaining homogeneous powdered milk, it is considered that it is waited to be lost of bubbles and then spray dried after dispersing the gas. Moreover, it is supposed that the gas is dried after ingredients such as lactose are crystallised. However, in the present invention, the prescribed gas is dispersed in liquid milk at gas dispersal process (S112), and the liquid milk with small filling density is sprayed, then powdered milk having abovementioned characteristics was effectively obtained.

Additionally, powdered milk having bigger particle diameter than prescribed particle diameter is obtained by classifying powdered milk, and average of particle diameter of this powdered milk becomes bigger, then powdered milk becomes suitable for manufacturing solid milk (especially, good solubility).

The present invention basically relates to a method of manufacturing solid milk based on the abovementioned knowledge. The present invention of manufacturing method of solid milk includes a gas dispersal (gas mix) process (S112) and a spray drying process (S114).

In this case, the gas dispersal process (S112) serves to disperse the prescribed gas in liquid milk which is a raw material of powdered milk. The spray drying process (S114) serves to spray and dry the liquid milk to obtain powdered milk. The compaction molding process (S130) serves to compact powdered milk which is produced after the gas dispersal process (S112) and the spray dry process (S114), and to obtain a compaction molded body of powdered milk which forms solid.

In the present invention, at the spray drying process (S114), liquid milk in which the prescribed gas is dispersed (mixed), namely liquid milk with low density but increased apparent volume is preferably sprayed and dried. In this way, though high porosity is kept, the compaction molded body of powdered milk with high hardness after compaction molding is obtained. Thus, both solubility of solid milk and necessary hardness for manufacturing solid are satisfied.

Also, the present invention of a desirable manufacturing method of solid milk includes a humidification process (S140) and a drying process (S160). The humidification process (S140) serves to humidify the compaction molded body of powdered milk obtained at the compaction molding process (S130). The drying process (S160) serves to dry the compaction molded body of powdered milk which is humidified at the humidification process (S140). By including these processes, the hardness of the compaction molded body of powdered milk can further be enhanced. In addition, a manufacturing process of solid milk is generally performed in a factory as a set of operation. In this case, at the compaction molding process (S130), a solidified compaction molded body of powdered milk on some level is transported to a humidification room (where the humidification process is performed), and then transported to a drying room (where the drying process is performed). When the compaction molded body of powdered milk during production is transported to these separated rooms, a transporting apparatus such as a conveyer belt is used. In an existing manufacturing method of solid milk, the compaction molded body of powdered milk easily loses its shape when transporting during production. However, when powdered milk is manufactured, the above mentioned gas dispersal process (S112) is performed, then the compaction molded body of powdered milk can keep its sufficient shape at the transporting process in a factory.

The present invention of a desirable manufacturing method of solid milk serves to disperse prescribed gas in concentrated liquid milk (concentrated milk) at the gas dispersal process (S112). In this way, at the spray drying process (S114), viscosity of the liquid milk is increased, as a result, powdered milk having big average particle diameter which is suitable for manufacturing solid milk can be easily obtained. In other words, the function or the effect of the gas dispersal process (S112) becomes remarkable by increasing viscosity of the liquid milk.

The present invention of a desirable manufacturing method of solid milk is that in the gas dispersal process (S112) prescribed gas is pressured and the prescribed gas is dispersed in liquid milk by mixing the gas into the liquid milk. In this way, the prescribed gas can be easily and certainly dispersed in liquid milk.

The present invention of a desirable manufacturing method of solid milk is that in the gas dispersal process (S112) one or two or more gas which is selected from a group comprising carbon dioxide (carbon dioxide gas), air, nitrogen, oxygen and rare gas is used as prescribed gas. Thus, in the present invention various gases can be options. Therefore, the gas dispersal process can be easily performed by using a gas easily available. Further, carbon dioxide is not limited to a gas, can be dry ice or a mixture of dry ice and a gas. Thus, in an environment of spray drying process solid or liquid evaporating easily can be used as the prescribed gas.

The present invention of a desirable manufacturing method of solid milk includes a process for pouring liquid milk having dispersing gas at a specific volume flow along flow path in order to spray liquid milk having abovementioned dispersing gas in the spray drying process (S114). In this case, prescribed gas is mixed (in-line mixing) into the liquid milk while pouring liquid milk along the flow path in such a way that a ratio of a specific volume flow of prescribed gas to volume flow of solid milk is within the range of $1 \times 10^{-2}$ times to 7 times the volume of liquid milk. This can control for flow volume of prescribed gas to become constant to the total volume flow, and enhance homogeneousness of real manufacturing powdered milk. Moreover, mixing continuously a gas and liquid milk in seal-up system is preferable because it prevents from being contaminated by bacteria and enhances the aspect of good hygiene of powdered milk.

The present invention of a desirable manufacturing method of solid milk includes a classification process (S120) before the compaction molding process (S130). This classification process (S120) is a process for classifying powdered milk obtained by the spray drying process (S114). At this process, powdered milk which has bigger particle diameter than prescribed particle diameter can be obtained. Thus, average particle diameter of powdered milk becomes big by extracting (selecting) powdered milk having big particle diameter. In this way, porosity of the compaction molded body of powdered milk or solid milk can be enhanced, as a result, the compaction molded body of powdered milk or solid milk with suitable hardness for practical use in manufacturing can be produced. In other words, preferably a manufacturing method of solid milk includes both the gas dispersal process (S112) and the classification process S120).

Furthermore, according to the present invention of a manufacturing method of solid milk, for example, the compaction molded body of powdered milk, which hardness after compaction molding is within a range of 6N to 22N and porosity is within a range of 44 percents to 55 percents, is produced. This compaction molded body of powdered milk has suitable hardness for keeping good silhouette during manufacturing processes, superior solubility, and practical utility in manufacturing.

By the way, in the present specification, the term porosity means the ratio of air gap volume in the bulk volume of powdered milk (a powder) (for example, see Miyajima Koichiro, Ed., Development of Drugs (Vol. 15), published by Hirogawa Shoten (1989), p. 240), more specifically a value calculated by using a value of filling density of measuring solid milk in the below-described examples.

In the present specification the term solid milk means milk (milk or modified milk) modified to be in a solid state (a block or a tablet etc) at normal temperature. More specifically solid milk means milk obtained by molding powdered milk to the prescribed size (dimentions) and mass, when it dissolves to solvent such as water, it becomes the same thing as dissolving powdered milk.

Effect of the Invention

In accordance with the present invention, suitable powdered milk for manufacturing solid milk can be easily produced by simply dispersing a prescribed gas in liquid milk by a prescribed way. Additionally, the powdered milk produced in this way has superior compaction moldability. By compaction molding this powdered milk, solid milk with suitable hardness for practical use can be produced. Furthermore, hardness of solid milk can be enhanced by performing the humidification process and the drying process.

BEST MODE FOR CARRYING OUT THE INVENTION

Hereinafter, the best mode of the present invention will be described. However, following embodiments are absolutely exemplifications. Therefore, these embodiments can be modified according to obvious knowledge of a person skilled in the art.

Figure 1:
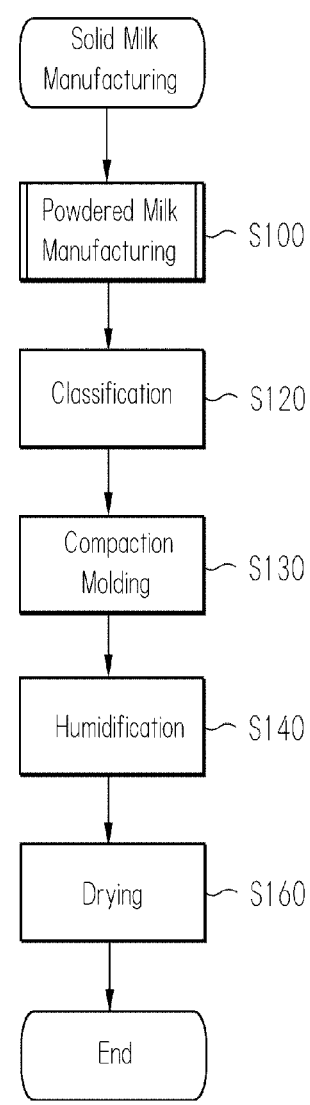
FIG. 1 is a flowchart for describing the present invention of a method for manufacturing solid milk.

FIG. 1 is a flowchart for describing an example of the present invention of a method for manufacturing solid milk. [S] in each figure means a manufacturing process (step).

The method of manufacturing solid milk produces schematically solid milk from powdered milk in the form of a solid which is produced from milk or modified milk in the form of liquid including water (liquid milk). As illustrated by FIG. 1, an example of a method for manufacturing solid milk includes a powdered milk manufacturing process (S100), a classification process (S120), a compaction molding process (S130), a humidification process (S140), and a drying process (S160). Therefore, the method for manufacturing solid milk includes a method for manufacturing powdered milk.

In the powdered milk manufacturing process (S100) powdered milk is produced from liquid milk. Liquid milk as an ingredient of powdered milk includes at least milk constituent (for example, nutrient component of milk), and, for instance, water content rate of liquid milk is 40 mass percents-95 mass percents. On the other hand, in powdered milk produced from the liquid milk, for example water content rate of powdered milk is 1 mass percent-4 mass percent. Namely, because if powdered milk contains a lot of water, preservative quality becomes worse and it is easy for deterioration in the flavour and the discoloration of externals to progress. Details of this process will be described below by using FIG. 2.

The classification process (S120) is a process for extracting (selecting) powdered milk having in range of necessary particle diameter by classifying powdered milk obtained by the powdered milk manufacturing process (S100) by each particle diameter. In order to classify powdered milk by particle diameter, for instance, all powdered milk is passed through or set on plural sieves having different sieve mesh size (sieving). Specifically, by setting all powdered milk on a sieve having big sieve mesh size, powdered milk having smaller particle diameter than the mesh size of the sieve is passed through the sieve, and powdered milk having bigger particle diameter than the mesh size of the sieve is remained on the sieve. In this way, powdered milk having too big particle diameter (massed powder, coagula, etc) which is remained on the sieve can be removed from all powdered milk. At this time, powdered milk passed through a sieve having big mesh size is set on a sieve having small mesh size, and then it is performed in the same way. In this way, powdered milk having unnecessary small particle diameter that passed through the sieve is removed. Therefore, powdered milk having in range of necessary particle diameter is remained on the sieve having small mesh size. Namely, in the present process powdered milk obtained at the spray drying process is selected by particle size. In addition, this process can be skipped if necessary facilities for the classification cannot be prepared.

The compaction molding process (S130) is a process for obtaining a solidified compaction molded body of powdered milk by compaction molding (for example, tableting) powdered milk under relatively low compaction pressure. This leads to keep a certain degree of good silhouette of the compaction molded body of powdered milk to move towards the subsequent process, and secure many air gaps for approaching water (solvent). Namely, if a certain degree of good silhouette of the compaction molded body of powdered milk is not kept, there is a possibility that compaction molded shape can not be kept at the subsequent process. Moreover, this porosity of the compaction molded body of powdered milk is defined by many air gaps, and closely relates to porosity of solid milk.

As an ingredient of the compaction molding process, for example, only powdered milk produced by the powdered milk manufacturing process (S100) can be used. Namely, powdered milk without adding substantial additive can be used. The additive means an adhesive, a disintegrant, a lubricant, an expansion agent and so on, and nutrient component is excluded from the additive. However, the additive may be used as an ingredient of powdered milk if additive amount is for example 0.5 mass percent like additive amount that does not influence nutrient component of solid milk. In this case, powdered milk having for example 0.5 mass percent-4 mass percent of free fat can be desirably used. This leads that free fat in powdered milk can be performed as a lubricant or an adhesive.

In order to lessen a compaction pressure at the time of compaction molding, powdered milk having high fat content rate is better. Therefore, preferably fat content rate of powdered milk being subject to the compaction molding is for example 5 mass percent-70 mass percent.

In the compaction molding process, in order to obtain a solidified compaction molded body of powdered milk from powdered milk, a compaction means is used. A pressured molding machine such as a tableting machine or a compression testing machine is an example of the compaction means. The tableting machine comprises a die as a mold for powdered milk (powder) and a punch for hitting to the die. Further, powdered milk is introduced into the die (mold) and is hit by the punch, and then a compaction molded body of powdered milk can be obtained by the added compaction pressure. In addition, in the compaction molding process it is desirable to compact powdered milk continuously.

In the compaction molding process, ambient temperature is not specifically regulated. For example, this process can be carried out at room temperature. More specifically, ambient temperature in the compaction molding process can be 10 degrees C. to 30 degrees C. In this case, ambient humidity can be, for example, 30 percents RH to 50 percents RH. The compacting force is for example 1 MPa to 30 MPa (preferably 1 MPa to 20 MPa). In this embodiment especially when powdered milk is solidified, preferably porosity is controlled within a range of 30 percents to 60 percents, and hardness of the compaction molded body of powdered milk is controlled within a range of 6N to 22N by adjusting within a range of 1 MPa to 30 MPa of compacting pressure. This leads to produce high utility solid milk having both solubility and convenience (easily handled). Moreover, as hardness of the compaction molded body of powdered milk, hardness should be at least a certain degree for keeping good silhouette (not losing shape) at the subsequent humidification process and drying process (for example 4 N).

The humidification process (S140) is a process for humidifying the compaction molded body of powdered milk obtained by the compaction molding process (S130). When the compaction molded body of powdered milk is humidified, tackiness is generated on a surface of the compaction molded body of powdered milk. Wetting the compaction molded body of powdered milk partially dissolves and bridges together the particles located close to the surface of the compaction molded body of powdered milk. And, when drying it, the strength close to the surface of the compaction molded body of powdered milk (solid milk) is increased compared to the strength of the inner of the compaction molded body of powdered milk. In the present embodiment a degree of bridges (a degree of broadening) is adjusted by adjusting time putting under high humid environment (humidification time). Thus hardness of the compaction molded body of powdered milk (uncured solid milk) before humidification process (for example, 6 N to 22 N) can be enhanced to the necessary purposed hardness for solid milk (for example, 40 N). However, a range (broadness) of the possible enhanced hardness by adjusting hum humidification time is limited. Namely, when transporting the compaction molded body of powdered milk by a conveyer belt to humidify after compaction molding, shape of the solid milk can not be kept in case of insufficient hardness of the compaction molded body of powdered milk. On the other hand, solid milk with small porosity and poor solubility is obtained if hardness of the compaction molding body of the powdered milk is too enough at the time of compaction molding. Therefore, preferably it is compaction molded for having enough hardness of the compaction molded body of powdered milk (uncured solid milk) before humidification process and keeping enough solubility of solid milk.

In the humidification process, a humidification method of the compaction molded body of powdered milk is not specifically regulated. For example, a method of placing in a high-humidity environment, a method of directly spraying water with a sprayer, and a method of blowing steam can be employed. Examples of humidification means to humidify the compaction molded body of powdered milk include a high-humidity chamber, a sprayer, and steam.

Humidity of the high-humidity environment is, for example, 60 percents RH to 100 percents RH. The temperature in the method of placing under high-humidity environment is, for example, 30 degrees C. to 100 degrees C. Humidification time is, for instance, 5 seconds to 1 hour.

The amount of moisture (also referred to herein below as humidification amount) added to the compacted body of powdered milk in the humidification process may be appropriately adjusted. Preferably humidification amount is set to 0.5 mass percent to 3 mass percent of the mass of the compaction molded body of powdered milk after the compaction molding process. If the humidification amount is set to less than 0.5 mass percent, hardness (tablet hardness) of solid milk is not enough. On the other hand, if the humidification amount is set to more than 3 mass percent, the compaction molded body of powdered milk is excessively melted into liquid state or gelled state, further compaction molded shape is changed or it adheres to a machine such as a conveyer belt during transporting.

The drying process (S160) is a process for drying the compaction molded body of powdered milk humidified at the humidification process (S140). Because the compacted molded body of powdered milk that was humidified in the humidification process is dried in the drying process, surface tackiness is eliminated and the solid milk can be handled as a product. Thus, the humidification process and the drying process correspond to a process for adjusting to be necessary quality of solid milk as a product by enhancing the hardness of the compaction molded body of powdered milk after the compaction molding (solid milk).

Well-known methods capable of drying the compacted molded body of powdered milk that was humidified in the humidification process can be employed as drying methods in the drying process that is not specifically limited. Examples of suitable methods include a method of placing under a low-humidity and high-temperature atmosphere and a method of bringing into contact with dry air or high-temperature dry air.

Humidity in the method involving placing under a low-humidity and high-temperature atmosphere is for example 0 percent RH to 30 percents RH. It is thus preferred that humidity is set to as a low level as possible. Temperature in the method involving placing under a low-humidity and a high-temperature atmosphere is for example 20 degrees C. to 150 degrees C.

Drying time in the method involving placing under a low-humidity and a high-temperature atmosphere is for example 0.2 min to 2 h.

By the way, if the moisture content of solid milk is increased, preservative quality becomes worse and it is easy for deterioration in the flavour and the discoloration of externals to progress. For this reason, in the drying process, the moisture content ratio of the solid milk is preferably controlled (adjusted) to be no more than 1 percent higher or lower than the moisture content ratio of the powdered milk used as the ingredient by controlling the conditions of the temperature or the time to dry.

The solid milk in accordance with the present invention is generally dissolved in warm water and drunk. More specifically, warm water is poured into a container provided with a lid and then the necessary number of pieces of the solid milk is placed therein, or the water is poured after the pieces of the milk are placed. And, it is preferred that the solid milk be rapidly dissolved by lightly shaking the container and drunk in a state with an appropriate temperature. Further, when one or more than two pieces of the solid milk (more preferably, one piece of solid milk) is dissolved in warm water, a volume of solid milk can be adjusted to be necessary amount of liquid milk for one drinking. For example the volume of solid milk is 1 $cm^3$ to 50 $cm^3$. Moreover, the volume of the solid milk can be adjusted by changing amount of powdered milk which is used at the compaction molding process.

Details of solid milk are described following. The components of solid milk are basically identical to those of powdered milk serving as an ingredient. Examples of solid milk components include fats, proteins, glucide, minerals, vitamins, and water.

There are many air gaps (for example, pores) in the solid milk. These plural pores are preferably dispersed uniformly (distributed) in the solid milk. Because the pores are almost uniformly distributed in the solid milk, the solid milk is uniformly dissolved and a higher solubility can be obtained. In this case, since the larger (wider) the pores are, the easier water as a solvent penetrates therein, a high solubility can be obtained. On the other hand, if the pore size is too large, strength decreases or the surface of solid milk becomes rough. Accordingly, the pore size is for example 10 micrometers to 500 micrometers. Further, such pore size or dispersal of many air gaps can be measured by well-known means, for example, by observing the surface and cross section of solid milk with a scanning electron microscope. By these measurements porosity of solid milk can be defined.

The solid milk in accordance with the present invention is solid milk with a porosity of for example 30 percents to 60 percents. The higher the porosity is, the higher the solubility is, but the more decreasing the hardness (strength) is. Furthermore, if the porosity is small, solubility decreases. The porosity is mainly controlled by adjusting the compacting force in the compacting molding process. Specifically, the lower the compaction pressure is, the higher the porosity is, while the higher the pressure is, the lower the porosity is. The porosity of the solid milk thus can be controlled, therefore it is not limited within a range of 30 percents to 60 percents, and then the porosity is appropriately adjusted as usage. As described below, if the porosity is adjusted within those ranges, good solid milk free from problems of oil-off or the like can be obtained.

The shape of the solid milk is defined by the shape of the die (mold) for compaction molding, but it is not specifically limited if it has a certain size (dimensions). Thus, the solid milk may have the shape of round rods, elliptical rods, rectangular parallelepipeds, cubes, plate, balls, polygonal rods, polygonal cones, polygonal pyramids, and polyhedrons. From the standpoint of convenience of molding and transporting, the shape of round rods, elliptical rods, or rectangular parallelepipeds is preferred. Furthermore, in order to prevent the solid milk from fracturing during transporting, it is preferred that the corner portions be rounded.

The solid milk has to have a certain solubility in a solvent such as water. The solubility can be evaluated by the time of dissolving solid milk perfectly or remaining amount (dissolution residue of mass as described below in Examples) in the prescribed time for example when solid milk as a solute and water as a solvent are prepared for a specified concentrated level.

The solid milk also has to have a certain hardness (strength) to prevent it from fracturing during transportation. The solid milk preferably has a hardness of 31 N or higher, more preferably 40 N or higher in this case. On the other hand, from the standpoint of solubility, the maximum hardness of solid milk is for example 300 N, preferably 60 N. The hardness of solid milk can be further measured by well-known methods.

Figure 2:
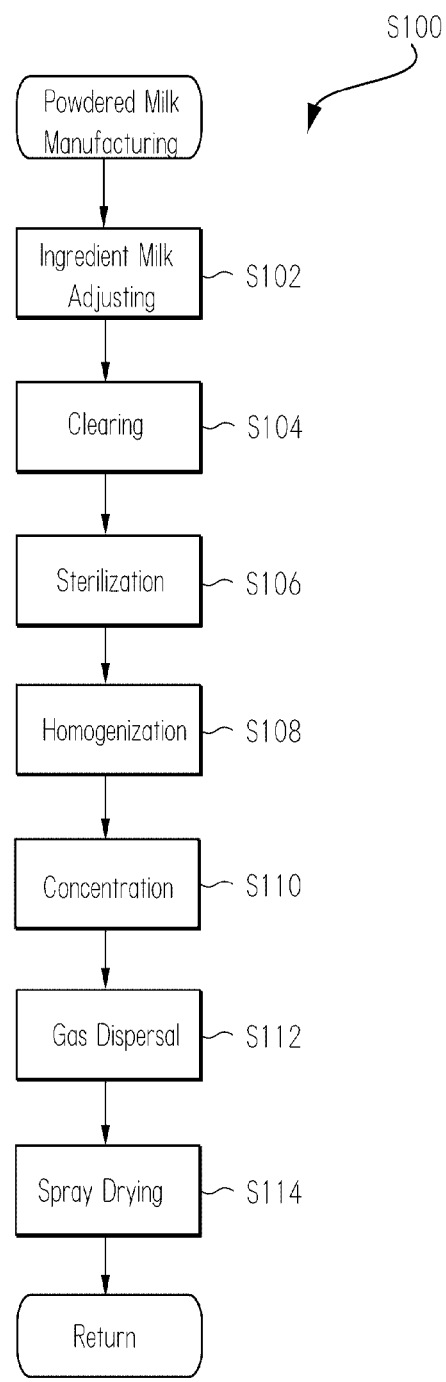
FIG. 2 is a flowchart for explaining in detail the powdered milk manufacturing process described in S100 of FIG. 1.

Now the powdered milk manufacturing process is described in detail. FIG. 2 is a flowchart for explaining in detail the powdered milk manufacturing process described in S100 of FIG. 1. In this embodiment a case of manufacturing modified powdered milk as powdered milk is explained. The modified milk is simply one example of the powdered milk to be produced, if the powdered milk is suitable for manufacturing solid milk, it can be all powdered milk, powdered skimmed milk, or creamy powder. This powdered milk can be produced by the same process as described in FIG. 2.

In general, by modifying, concentrating, and spray drying liquid milk including water (ingredient milk), powdered milk for the above mentioned compaction molding process (S130) is produced. The example of the powdered milk manufacturing process includes an ingredient milk adjusting process (S102), a clearing process (S104), a sterilization process (S106), a homogenization process (S108), a concentration process (S110), a gas dispersal process (S112), and a spray drying process (S114) as illustrated in FIG. 2.

The ingredient milk adjusting process (S102) is a process for adjusting the kinds of milk in a liquid state (liquid milk) as an ingredient of powdered milk. Therefore, liquid milk as an ingredient of powdered milk includes at least milk constituent (for example milk component), and for example water content rate of the liquid milk is 40 mass percent to 95 mass percent. When manufacturing the adjusted powdered milk as powdered milk, nutrient component described below as an ingredient of powdered milk is added into the above-mentioned liquid milk. Ingredients of powdered milk further may comprise only milk constituent, such as raw milk (whole fat milk), defatted milk, and cream. In this case, the ingredient milk adjusting process can be omitted as the need arises.

Milk is used as an ingredient for the said powdered milk. Fresh milk can be used as the milk. More specifically, milk from cows (Holstein cows, Jersey cows, and the like), goats, sheep, and buffalos can be used. Fat is contained in their milk. Then, the content ratio of fat in the milk can be adjusted by removing part of the fat by centrifugal separation or the like. Thus the fat content rate of the ingredient milk (liquid milk) can be adjusted.

Nutritional components for ingredients of the said powdered milk are fats, proteins, carbohydrate, mineral, vitamin etc. More than one nutritional component, preferably more than two, more preferably all are used out of the components. For this, the suitable powdered milk or solid milk for nutritional support or enhancement can be produced.

The protein as ingredients of powdered milk is peptides or amino acids of various chain length obtained by decomposing milk proteins, milk protein fractions, animal proteins or plant proteins with enzymes. More than one from those proteins is used. Milk proteins are for example casein, whey proteins (alpha-lactoalbumin, beta-lactoalbumin, and the like), whey protein concentrate (WPC), and whey protein isolate (WPI). Animal proteins are for example egg protein. Plant proteins are for instance soybean protein and wheat protein. Amino acids are for example taurine, cystine, cysteine, alginine, and glutamine.

Animal oils and fats, vegetable oils, fractionated oils, hydrogenated oils, and transesterified oils thereof can be used individually or in mixtures as oils and fats serving as ingredients for powdered milk. Animal oils and fats are for example milk fat, lard, beef tallow and fish oil. Vegetable oils are for instance soybean oil, rapeseed oil, corn oil, coconut oil, palm oil, palm kernel oil, safflower oil, cotton seed oil, linseed oil, and MCT.

Oligosaccharides, monomeric sugar, polysaccharides, and artificial sweeteners can be used individually or in mixtures as carbohydrate serving as ingredients for powdered milk. Oligosaccharides are for example milk sugar, cane sugar, malt sugar, galacto-oligosaccharide, fructo-oligosaccharide, and lactulose. Monomeric sugars are for example grape sugar, fructose and galactose. Polysaccharides are for instance starch, soluble polysaccharides, and dextrin.

Natrium, kalium, calcium magnesium, iron, copper, zinc, phosphorus, chlorine can be used individually or in mixtures as minerals serving as ingredients for powdered milk.

The clearing process (S104) serves to remove fine foreign matter contained in the liquid milk. To remove the matters in the cow milk, means such as a centrifugal separator or a filter can be used.

The sterilization process (S106) serves to kill micro-organisms such as bacteria that are contained in water of the liquid milk or milk constituent. Conditions of sterilization (sterilization temperature or holding time) are appropriately set corresponding to micro-organisms because kinds of the micro-organisms supposed to be actually contained depend on type of liquid milk.

The homogenization process (S108) is any process for homogenizing liquid milk. Specifically, particle diameter of solid components such as fat globules contained in the liquid milk is changed smaller, and then solid components are uniformly dispersed in the cow milk. To reduce the particle diameter of solid components, they are passed through a narrow gap for example under a high applied pressure.

The concentration process (S110) is any process for concentrating the liquid milk prior to the below-described spray drying process. For example a vacuum evaporator can or an evaporator can be used for concentrating liquid milk. The concentration conditions are appropriately set within the range of not widely metamorphosing liquid milk components. This leads to obtain concentrated milk from liquid milk. Namely, in the present invention, preferably a gas is dispersed and spray dried into the concentrated liquid milk (concentrated milk). In this case, water content rate of the concentrated milk is for example 35 mass percent to 60 mass percent, preferably 40 mass percent to 60 mass percent, more preferably 40 mass percent to 55 mass percent. When dispersing a gas into this concentrated milk, density of the liquid milk (concentrated milk) is declined and the milk becomes bulky. By spray drying this bulky concentrated milk, powdered milk having suitable character for producing solid milk can be obtained, in addition, if moisture of liquid milk is few, or disposal amount of liquid milk for the spray drying process is small, this process can be skipped.

The gas dispersal process (S112) is a process for dispersing a prescribed gas into the liquid milk (concentrated milk). In this case the volume of the dispersed gas is for example $1 \times 10^{-2}$ times to 7 times the volume of the liquid milk. Preferably, it is $1 \times 10^{-2}$ times to 5 times, more preferably, $1 \times 10^{-2}$ times to 4 times, and most preferably, it is $5 \times 10^{-2}$ times to 3 times.

The prescribed gas is preferably pressured in order to disperse the prescribed gas into the liquid milk. The pressure for pressuring the gas is not especially regulated if it is within a range enabling the gas to disperse into the liquid milk effectively. However, for example it is 1.5 atm to 10 atm, preferably 2 atm to 5 atm or less. Because Liquid milk is sprayed in the following spray drying process (S114), liquid milk is flowed along a prescribed flow path. In this gas dispersal process, the said gas is dispersed (mixed) into the liquid milk by running the prescribed gas pressured into the flow path. Thus, the prescribed gas can be easily and securely dispersed into the liquid milk.

Thus, by performing the gas dispersal process, density of the liquid milk (concentrated milk) is decreased, and appearance volume (bulk) is increased. Filling density of the liquid milk can be further calculated by the weight of the liquid milk dividing by the total volume of liquid milk at liquid and bubble state. It can be also measured by an apparatus for measuring filling density by bulk density measurement based on JIS (pigment: JIS K5101 compliant) or like.

Consequently, liquid milk where the prescribed gas is dispersed is flowed at the abovementioned flow path. In this flow path, volume flow of the liquid milk is preferably controlled to be constant.

In the present embodiment, carbon dioxide (carbon dioxide gas) can be used as a prescribed gas. In this flow path, ratio of volume flow of carbon dioxide to the volume flow of liquid milk (hereinafter, referred to percentage of it as $CO_2$ mix ratio [percent]) is for example 1 percent to 700 percents, preferably 2 percents to 300 percents, more preferably 3 percents to 100 percents, most preferably 5 percents to 45 percents. Thus, when volume flow of carbon dioxide is controlled to be constant to the volume flow of the liquid milk, homogeneousness of the powdered milk from this manufacture method can be enhanced. However, when the $CO_2$ mix ratio is too big, efficiency of powdered milk manufacture becomes worse since percentage of flowing powdered milk at the flow path is low. Therefore, maximum of the $CO_2$ mix ratio is preferably 700 percents. Moreover, the pressure for pressuring carbon dioxide is not especially regulated when the pressure is within a range enabling the carbon dioxide to disperse into the liquid milk effectively. However, for example the atmosphere pressure is 1.5 atm or more and 10 atm or less, preferably 2 atm or more and 5 atm or less. Mixing continuously (in-line mixing) a gas and liquid milk in seal-up system is preferable because it securely prevents from being contaminated by bacteria and enhances the aspect of good hygiene of powdered milk (or keeps the good clearness of the milk).

In this embodiment, the prescribed gas used in the gas dispersal process (S112) was carbon dioxide gas. In other embodiment of the present invention, instead of carbon dioxide gas or with carbon dioxide gas, one or more than two gas selected from a group comprising air, nitrogen ($N_2$), and oxygen ($O_2$) can be used, and rare gas (for example, argon (Ar), helium (He)) can be used. Nitrogen gas can be further used instead of carbon dioxide gas. Therefore, since various gases can be options, the gas dispersal process can be easily performed by using a gas easily available. In the gas dispersal process (S112), if an inert gas such as nitrogen or rare gas is used, there is no possibility to react with nutrient component of the liquid milk. Thus it is preferable rather than using air or oxygen since there is less possibility to deteriorate liquid milk. In this case, the ratio of volume flow of the said gas to volume flow of liquid milk is for example 1 percent to 700 percents, preferably 1 percent to 500 percents, more preferably 1 percent to 400 percents, most preferably 1 percent to 300 percents. For example, according to Bell et al, (R. W. Bell, F. P. Hanrahan, B. H. Webb: Foam Spray Methods Of Readily Dispersible Nonfat Dry Milk, J. Dairy Sci, 46(12)1963. pp 1352-1356), air having about 18.7 times the volume of non fat milk was dispersed into non fat milk to obtain powdered skimmed milk. In the present invention, the gas is dispersed within the abovementioned range for the powdered milk having suitable character for producing the solid milk. However, to decrease the density of liquid milk certainly as a result of having dispersed the gas into liquid milk in the gas dispersal process (S112), a gas which is easily dispersed or is easily dissolved into liquid milk is preferably used. Therefore, a gas having high water solubility is preferably used, specifically, solubility of a gas is preferably 0.1 $cm^3$ or more per water 1 $cm^3$ at 20 degrees C. Carbon dioxide is not limited to a gas, can be dry ice, or a mixture of a gas and dry ice. Namely, in the gas dispersal process, if a prescribed gas can be dispersed into the liquid milk, solid can be used. In the gas dispersal process carbon dioxide can be dispersed rapidly into the liquid milk in cooling state by using dry ice, as a result, powdered milk having suitable character for producing solid milk can be obtained.

The spray drying process (S114) serves to obtain powdered milk (a powder) by evaporating moisture in the liquid milk. The powdered milk obtained at the spray drying process (S114) is the powdered milk obtained by performing the gas dispersal process (S112) and the spray drying process (S114). This powdered milk is bulky compared to powdered milk obtained by not having the gas dispersal process (S112). Volume of the former is preferably 1.01 times to 10 times volume of the latter, or can be 1.02 times to 10 times, or can be 1.03 times to 9 times.

In the spray drying process (S114), liquid milk having prescribed dispersed gas and keeping small density since the gas dispersal process (S112) is spray dried. Specifically, volume of liquid milk after dispersing a gas is 1.05 times to 3 times, preferably 1.1 times to 2 times compared to the volume of liquid milk before dispersing a gas. Namely, the spray drying process (S114) is performed just after finishing the gas dispersal process (S112). However, just after finishing the gas dispersal process (S112), liquid milk is not homogeneous. Therefore, the spray drying process (S114) is performed after 0.1 seconds to 5 seconds, preferably after 0.5 seconds to 3 seconds after finishing the gas dispersing process (S112). Namely, the gas dispersal process (S112) and the spray drying process (S114) are continuous. Thus, liquid milk is poured in a gas dispersal machine continuously and a gas is dispersed, then liquid milk dispersed the gas is supplied to a spray drying machine, and is spray dried continuously.

To evaporate moisture, a spray dryer can be used. The spray dryer comprises a flow path for flowing liquid milk, a pressure pump for pressuring liquid milk for flowing liquid milk along the flow path, a dry chamber for having wider room than the flow path connecting an opening section of the flow path, a spraying machine (a nozzle, an atomizer, and so on) set at the opening section of the flow path. And the spray dryer transfers the liquid milk by the pressure pump to be abovementioned volume flow along the flow path towards the dry chamber. The concentrated milk is diffused by the spraying machine at close to the opening section of the flow path, and liquid milk at liquid drop (atomization) state is dried inside the drying chamber at high temperature (for example, hot wind). Namely, moisture is removed by drying liquid milk at the drying chamber, as a result, concentrated milk becomes solid of powder state, namely powdered milk. In addition, moisture amount in powdered milk is adjusted by setting the drying condition in the drying chamber appropriately, so that it makes powdered milk less likely to cohere. By using the spraying machine, surface area per unit volume of liquid drop is increased so that drying efficiency is enhanced and at the same time particle diameter of powdered milk is adjusted.

By performing the abovementioned processes, suitable powdered milk for manufacturing solid milk can be manufactured. Specifically, in the present embodiment, compaction moldability of powdered milk is enhanced because the powdered manufacturing process includes the air dispersal process. At the abovementioned compaction molding process (S130), compaction pressure is adjusted by using this better compaction moldability, and then porosity of solid milk manufactured from this is controlled and hardness is adjusted. In other words, if solid milk is manufactured by using powdered milk having high compaction moldability, solid milk having good hardness for practical use in manufacturing processes can be obtained although solid milk has high porosity. Solid milk having high porosity has good solubility because a solvent is easily entered. A compaction pressure at compaction molding is controlled for a compaction molded body of powdered milk (uncured solid milk) having enough hardness (for example, 6N-22N) for practical use. Consequently hardness for practical use in manufacturing processes can be obtained like keeping good silhouette from the compaction molding process through the humidification process. The compaction molded body of powdered milk can be obtained practically enough hardness as well for handling and transporting by the humidification process and the drying process.

Furthermore, according to the abovementioned embodiment (FIG. 1), average particle diameter of powdered milk can be bigger by the method for manufacturing solid milk including the classification process (S120). Because of this, suitable powdered milk for manufacturing solid milk can be produced certainly. Therefore, in the present embodiment, preferably the powdered milk manufacturing process includes the classification process.

Additionally, a filling process can be performed after the spray drying process (S114) or the aforementioned classification process (S120) as needed. In this filling process powdered milk is filled in a package or a can. This helps to transport powdered milk easily.

The solid milk of the present invention includes not only solid milk after the drying process (S160), but also uncured solid milk (compaction molded body of powdered milk) after the compaction molding process (S130).

EXAMPLE

The present invention is specifically described by the following Examples. However, the present invention is not regulated by the Examples.

Inventors researched regarding a method of manufacturing solid milk with their whole heart in order to manufacture solid milk having suitable hardness for practical use by manufacturing powdered milk having better compaction moldability. Specifically, prescribed gas is carbon dioxide gas, and they compared the characteristics of a method for manufacturing solid milk including the gas dispersal process (S112) (Example 1-3) to a method for manufacturing solid milk not including that process (Comparison example 1). Furthermore, in the gas dispersal process, an effect of differences (changes) of liquid milk density (bulk of powdered milk) was also researched by changing the proportion of dispersed gas to liquid milk (Example 1-3).

Example 1

In accordance with the powdered milk manufacturing process indicated by FIG. 2, powdered milk was manufactured. Specifically, liquid milk as an ingredient of powdered milk was obtained by adding milk component, proteins, carbohydrate, minerals and vitamins to water and mixing, further adding and mixing fats (S102). Then, by performing each process such as the clearing, the sterilization, the homogenization, and the concentration, (S104-S110), concentrated milk was obtained from adjusted liquid milk having relatively low concentration.

Then just before spray drying concentrated milk, a prescribed pressured gas was passed through the said concentrated milk (S112). Specifically, the carbon dioxide which was used as the prescribed gas was poured into the flow path of a spray drier so that the gas could have a constant volume flow, and the gas was mixed continuously with the concentrated milk in seal-up system. As a result, carbon dioxide was being dispersed into the concentrated milk.

Just after having dispersed carbon dioxide, the said concentrated milk was flowed at prescribed volume flow by using a pressured pump of a spray dryer along the flow path towards a drying chamber of the spray dryer (let liquid through). In this case, during flowing at the flow path, the concentrated milk maintained a prescribed gas dispersed state. Ratio of volume flow of prescribed gas just before being dispersed into the concentrated milk ($Nm^3/h$) to volume flow of the concentrated milk where a prescribed gas will be dispersed just after ($m^3/h$) is called mix ratio. Mix rate of carbon dioxide is hereinafter, referred as $CO_2$ mix ratio [percent]. It was 15 percents in this Example.

The said concentrated milk keeping low density was sprayed from the opening section of the flow path to the drying chamber. As a result, the concentrated milk became powdered milk by being dried at the drying chamber (S114). The powdered milk obtained thus was more bulky than the powdered milk in Comparison Examples discussed later. The component of the obtained powdered milk 100 g comprised fats 18 g, proteins 15 g, carbohydrate 60 g, and others 7 g. In addition, average particle diameter of the powdered milk was 295 micrometers. Weight of each compartment of sieves (each sieve mesh size is 710 micrometers, 500 micrometers, 355 micrometers, 250 micrometers, 180 micrometers, 150 micrometers, 106 micrometers, 75 micrometers) was measured by a classification method, and then average particle diameter of powdered milk [micrometer] was calculated based on the proportion of each compartment weight of a sieve to total weight.

Successively, the obtained powdered milk was classified (S120) so that the powdered milk on a sieve of 355 micrometers mesh size was collected. The average particle diameter of the collected powdered milk was 584 micrometers, and its yield constant (ratio of each compartment weight of sieves to total weight) was 28 percents.

Solid milk was manufactured from the powdered milk remained on the sieve of 355 micrometers mesh size. Specifically, the powdered milk was compaction molded first to make a rectangular parallelepiped of width 2.4 cm and depth 3.1 cm as an outward form by a single-punch tableting machine (manufactured by Okada Seiko Co., N-30E) (S130). In this case, amount of usage of powdered milk was adjusted to be 5.6 g of solid milk after the humidification process and the drying process. The pressure at the time of compaction molding was 1.8 MPa. By this, a compaction molded body of powdered milk in Example 1 (uncured solid milk) was obtained. Secondly, the combination oven (Combi oven, manufactured by Fujimach Co. FCCM6) was used as a humidifier. The room temperature and humidity in the humidifier was kept 65 degrees C. and 100 percents RH respectively. Under these conditions, the compaction molded body was left for 45 seconds (humidification time) to humidify the compaction molded body of powdered milk (S140). Air thermostatic oven (manufactured by Yamato Scientific Co., Ltd, DK600) was used as a drying chamber. The compaction molded body of powdered milk was dried under 95 for 5 minutes. Solid milk (solid milk after hardening) in Example 1 was manufactured by this method.

Mass of the solid milk in this Example 1 was 5.6 g per piece. This solid milk maintained the width and depth of a rectangular parallelepiped at the time of compaction molding. The thickness was 1.33 cm measured by a micrometer.

Porosity of solid milk in the Example 1 was calculated by the following formula. It was 49 percents.

$$\text{Porosity [percent]} = [1 - (W/PV)] * 100$$

In the above mathematical formula, W means weight [g] of solid milk, P means density [$g/cm^3$] of measured solid milk by the Beckman pneumatic density meter, V means volume [$cm^3$] of calculated solid milk or compaction molded body of powdered milk from thickness measured by the micrometer and mold (die) shape (width and depth).

Furthermore, hardness of the solid milk in the embodiment 1 was measured by a later described method, and it was 44 N. Hardness of the compaction molded body of powdered milk in the Example 1 (uncured solid milk which was compaction molded, but did not perform both the humidification process and the drying process) was 4 N.

The hardness of solid milk or the compaction molded body of powdered milk (solid milk before hardening) was measured by a load cell tablet hardness meter manufactured by Okada Seiko Co., Ltd. Specifically, solid milk or the compaction molded body of powdered milk was pushed by a fracture terminal of this hardness meter (width 1 mm) towards short axis of solid milk or the compaction molded body of powdered milk of a rectangular parallelepiped at a constant speed of 0.5 mm/s. The hardness was measured by calculating a loading [N] when fracturing the solid milk or the compaction molded body of powdered milk. Namely, the loading calculated by the abovementioned method means the hardness (tablet hardness) [N] of the solid milk or the compaction molded body of powdered milk.

The solubility of solid milk in the Example 1 was evaluated comprehensively based on the results of the following two test methods, the first test method and the second method.

The first test method is a method for checking visually solubility of solid milk. Specifically one or more than two of solid milk which was 5.6 g per piece was put into a bottle, and then a prescribed amount of hot water of 50 degrees C. (test liquid) was poured to the bottle, and left it for a prescribed period (10 seconds). By adjusting a number of the solid milk and weight of the hot water, concentration of solid milk (hereinafter, also referred to it as solute concentration) in the contents of the bottle was adjusted. In the present Example, solubility of solid milk was evaluated by the plural test methods (specifically the 4 methods of Test A, Test B, Test C and Test D of Table 1 described below), such as changing the solute concentration, or changing a number of pieces of solid milk or weight of hot water but keeping solute concentration.

After that, the lid of the bottle was closed and the bottle was shaken for the prescribed period (15 seconds). Just after shaking, all contents of the bottle were poured to a rectangular tray. Continuously, it was conducted with eye whether there was an insolubilised lump in the contents on the tray. If there were insolubilised lumps, a number of pieces of the lumps and size (the longest size) measured, and further each lump was cut and it was conducted with eye whether the lump absorbed water. The insolubilised lump further means a part of the solid milk for the test which is insoluble in the test liquid (a part remained insoluble).

The results of the first test method were divided into the following 6 categories. Each category was allocated a score 0 to 5 respectively. In this case the score means an index for indicating the degree of solubility of solid milk. Small score means better solubility of solid milk.

Score 0: there is no insolubilised lump

Score 1: when there are one or more insolubilised lumps, size of each lump is 5 mm or less, and inside of the lump absorbs water (each lump is slurry, or part of lump is soluble state).

Score 2: when there are one or more insolubilised lumps, size of each lump is 5 mm or less, and at least one of the lump inside does not absorb water.

Score 3: when there are one or more insolubilised lumps, size of each lump is more than 5 mm~10 mm or less, and at least one of the lump inside does not absorb water.

Score 4: when there are one or more insolubilised lumps, size of each lump is more than 1 mm~20 mm or less, and at least one of the lump inside does not absorb water.

Score 5: when there are one or more insolubilised lumps, size of at least one lump is more than 20 mm.

The following Table 1 is a table for indicating a relationship among number of solid milk, mass of hot water, solute concentration and shaking time in the solubility of solid milk in the abovementioned first test method.

TABLE 1

| | Number of solid milk [piece] | Mass of hot water [g] | Solute concentration [mass %] | Shaking time [sec] |
|---|---|---|---|---|
| Test A | 2 (11.2 g) | 80 | 12.3 | 15 |
| Test B | 3 (16.8 g) | 120 | 12.3 | 15 |
| Test C | 4 (22.4 g) | 160 | 12.3 | 15 |
| Test D | 5 (28.0 g) | 120 | 18.9 | 15 |

The second test method is a method for evaluating the solubility of the solid milk quantitatively like a degree of solubility. Specifically, two pieces of solid milk (11.2 g) was put into the bottle, and then 80 g (80 mL) of 50 degrees C. of hot water (test liquid) was poured into the bottle, so that the solute concentration was 14 mass percent. It was left for 10 seconds.

After that, the bottle was rotated relatively gently like describing a circle by hand (specifically 4 times per second) and was shaked for the 5 seconds. Just after 5 seconds, all contents of the bottle was provided into a sieve which weight was known. The sieve was 0.49 mm (32 mesh). Mass [g] of undissolved residue on the sieve was measured. Specifically, after having wiped off the residue and the surface of the sieve to avoid dropping out the residue on the sieve, gross mass of the sieve and the residue was measured. The mass of the residue on the sieve was calculated based on the differences between the gross mass and mass of the sieve. Additionally, in this second test method it is indicated that the less the mass of residue is, the better solubility of the solid milk is.

In each Example (or Comparison Example), in case scores in the first test method was low (specifically value of the score is 2 or less in all of the test A-D) and solubility in the second test method could be judged as high (specifically mass of residue is less than 3.0 g), solubility of the solid milk in each Example was evaluated as excellent (double circle). In case in either of the first test method or the second test method solubility was evaluated as excellent, solubility of solid milk in each Example was evaluated as relatively excellent (single circle). In case in both the first test method and the second test method solubility was low, solubility of solid milk in each Example was evaluated as relatively poor (triangle). Especially, in case in the second test method the residue was more than 4.5 g, solubility of solid milk in each Example was evaluated as very poor (X).

When solubility of the solid milk in the Example 1 was evaluated, all score values in test A-D of the first test method was 2 or less, in the second test method mass of the residue was 1.8 g (less than 3.0 g). Therefore, solid milk in the Example 1 was evaluated excellent solubility (double circle).

Example 2

In Example 2, powdered milk was manufactured as the same as Example 1 except for having set $CO_2$ mix rate as 30 percents in the gas dispersal process. The powdered milk obtained from this method was bulkier than powdered milk in the Comparison Example as described below. The result of component of the manufactured powdered milk was perfectly the same as Example 1, Namely, the component of the obtained powdered milk 100 g comprised fats 18 g, proteins 15 g, carbohydrate 60 g, and others 7 g. In addition, an average particle diameter of powdered milk (no classification state) was 308 micrometers.

Also, in Example 2 solid milk was manufactured as the same as Example 1. The powdered milk was prepared to make a rectangular parallelepiped as an outward form by the abovementioned single-punch tableting machine. Amount of usage of powdered milk was adjusted to be 5.6 g per solid milk after the compaction molding process. The pressure at the time of compaction molding was 1.8 MPa. The thickness of this solid milk was 1.40 cm.

The porosity of the solid milk in Example 2 was 51 percents, and the hardness was 42 N. The hardness of the compaction molded body of powdered milk (uncured powdered milk without having both the humidification process and the drying process which was made by compaction molding classified powdered milk) was 4 N.

When solubility of the solid milk in Example 2 was evaluated, scores in all of the test A-D in the first test method were 1 or less, and in the second test method mass of the residue was 1.6 g (less than 3.0 g). Therefore, the solid milk in Example 2 was evaluated as excellent solubility (double circle).

Example 3

In Example 3, powdered milk was manufactured as the same as Example 1 except for having set $CO_2$ mix rate as 45 percents in the gas dispersal process. The powdered milk obtained from this method was bulkier than powdered milk in the Comparison Example as described below. The result of component of the manufactured powdered milk was perfectly the same as Example 1. Namely, the component of the obtained powdered milk 100 g comprised fats 18 g, proteins 15 g, carbohydrate 60 g, and others 7 g. In addition, an average particle diameter of powdered milk (no classification state) was 321 micrometers. And then, the powdered milk remained on the sieve of 355 micrometers mesh size was collected. The average particle size of this collected powdered milk was 561 micrometers, and its yield constant (the rate of collected mass to total mass) was 39 percents.

Also, in Example 3 solid milk was manufactured as the same as Example 1. The powdered milk was prepared to make a rectangular parallelepiped as an outward form by the abovementioned single-punch tableting machine. Amount of usage of powdered milk was adjusted to 5.6 g per solid milk after the compaction molding process. The pressure at the time of compaction molding was 1.5 MPa. The thickness of this solid milk was 1.48 cm.

The porosity of the solid milk in Example 3 was 54 percents, and the hardness was 40 N. The hardness of the compaction molded body of powdered milk (uncured powdered milk without having both the humidification process and the drying process which was made by compaction molding classified powdered milk) was 4 N.

When solubility of the solid milk in Example 3 was evaluated, all scores in all of the test A-D in the first test method were 0, and in the second test method mass of the residue was 0.7 g (less than 3.0 g), that was far less than 3.0 g as the evaluation standard value. Therefore, the solid milk in Example 3 was evaluated as excellent solubility (double circle).

Comparison Example 1

In Comparison Example 1, powdered milk was manufactured as the same as Example 1 except for having set $CO_2$ mix rate as 0 percent in the gas dispersal process (in other words, the gas dispersal process was skipped). The result of component of the manufactured powdered milk was perfectly the same as Example 1. Namely, the component of the obtained powdered milk 100 g comprised fats 18 g, proteins 15 g, carbohydrate 60 g, and others 7 g. In addition, an average particle diameter of powdered milk (no classification state) was 263 micrometers. Successively, the powdered milk remained on the sieve of 355 micrometers mesh size was collected. The average particle size of this collected powdered milk was 524 micrometers, and its yield constant (the rate of collected mass to total mass) was 23 percents.

Also, in Comparison Example 1 solid milk was manufactured as the same as Example 1. The powdered milk was prepared to make a rectangular parallelepiped as an outward form by the abovementioned single-punch tableting machine. Amount of usage of powdered milk was adjusted to 5.6 g per solid milk after the compaction molding process. The pressure at the time of compaction molding was 2.3 MPa. The thickness of this solid milk was 1.24 cm.

The porosity of the solid milk in comparison Example 1 was 44 percents, and the hardness was 50 N. The hardness of the compaction molded body of powdered milk (uncured powdered milk without having both the humidification process and the drying process which was made by compaction molding classified powdered milk) was 3 N.

When solubility of the solid milk in Comparison Example 1 was evaluated, all scores in all of the test A-D in the first test method were 2 or less, and in the second test method mass of the residue was 3.2 g (more than 3.0 g), that was far better than 3.0 g as the evaluation standard value. Therefore, the solid milk in Example 1 was evaluated as relatively poor solubility (rectangular).

Figure 3:
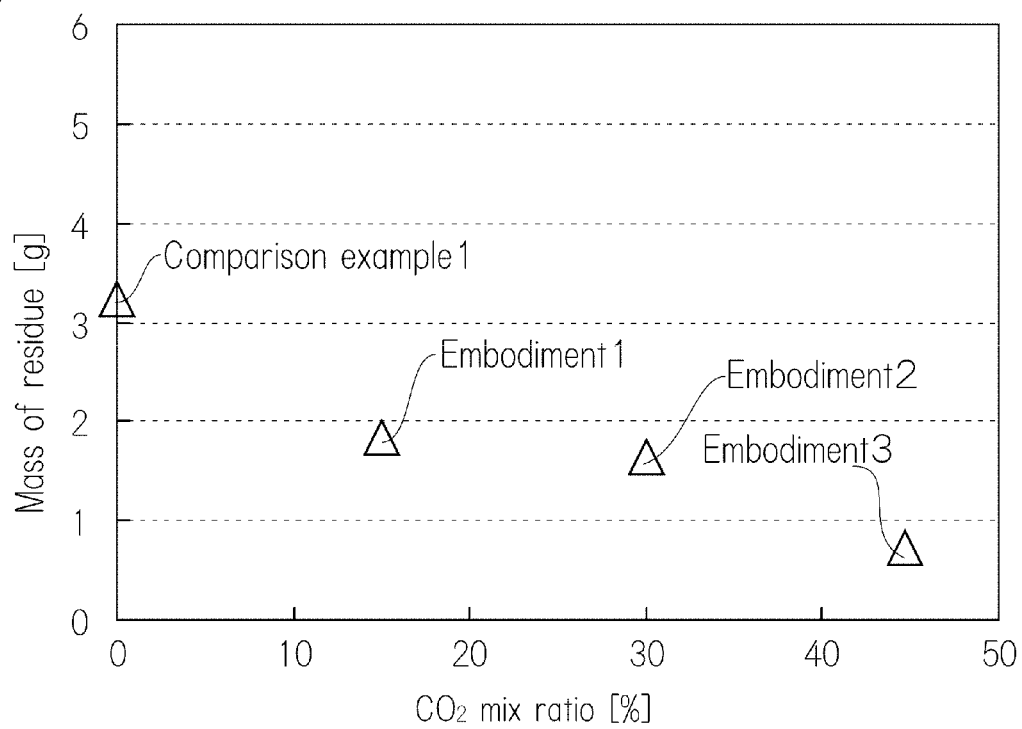
FIG. 3 shows a graph indicating a relationship between $CO_2$ mix rate [percent] at manufacturing powdered milk and mass of undissolved residue [g] in the second test method regarding to solid milk of Example 1-3 and Comparison Example 1.

Table 2, Table 3, Table 4 and FIG. 3 are illustrated by organising the evaluation results of Example 1-3 and Comparison Example 1 mentioned above. Table 2 shows the average particle diameter of the powdered milk in Example 1-3 and Comparison Example 1 and the average particle diameter after the classification. Table 3 shows each measurement value of solid milk in Example 1-3 and Comparison Example 1 and the evaluation results of solubility. Table 4 shows in detail the results of solubility test as the basics of overall judgement of solubility illustrated in Table 3. FIG. 3 shows a relationship between $CO_2$ mix rate [percent] at manufacturing powdered milk and mass of residue [g] in the second test method in solid milk of Example 1-3 and Comparison Example 1.

TABLE 2

Table 2

| | | Before classification | | After classification | |
|---|---|---|---|---|---|
| | | | Growth | | |
| | $CO_2$ mix ratio [%] | Avarage of particle diameter [μm] | rate of partcle diameter [%] | Average of particle diameter [μm] | Yield constant [%] |
| Comparison example 1 | 0 | 263 | 0 | 524 | 23 |
| Embodiment1 | 15 | 295 | 12 | 584 | 28 |
| Embodiment2 | 30 | 308 | 17 | 639 | 34 |
| Embodiment3 | 45 | 321 | 22 | 561 | 39 |

TABLE 3

Table 3

| | Gas dispersing | Compaction molding | Compaction molded body of powdered | Solid milk after humidification and drying | | | | |
|---|---|---|---|---|---|---|---|---|
| | $CO_2$ mix ratio [%] | Compaction pressure [MPa] | milk Hardness [N] | Thickness [mm] | Mass [g/piece] | Porosity [%] | Hardness N | Overall judgement of solubility |
| Comparison example 1 | 0 | 2.3 | 3 | 12.4 | 5.6 | 44 | 50 | ○ |
| Embodiment1 | 15 | 1.8 | 4 | 13.3 | 5.6 | 49 | 44 | ⓒ |
| Embodiment2 | 30 | 1.8 | 4 | 14.0 | 5.6 | 51 | 42 | ⓒ |
| Embodiment3 | 45 | 1.5 | 4 | 14.8 | 5.6 | 54 | 40 | ⓒ |

TABLE 4

Table 4

| | Solubility test | | | | |
|---|---|---|---|---|---|
| | First test method | | | | Second test method Mass of residue [g] |
| | Test A [score] | Test B [score] | Test C [score] | Test D [score] | |
| Comparison example 1 | 0 | 1 | 1 | 2 | 3.2 |
| Embodiment1 | 0 | 0 | 0 | 2 | 1.8 |
| Embodiment2 | 0 | 0 | 0 | 1 | 1.6 |
| Embodiment3 | 0 | 0 | 0 | 0 | 0.7 |

As shown in Table 1-3, the solid milk of Example 1-3 had high porosity compared to Comparison Example 1. This is also demonstrated that solid milk of Example 1-3 had high solubility compared to Comparison Example 1. Furthermore, the solid milk of Example 1-3 had not only high porosity, with lowering the compaction pressure, but also high hardness such as 40N-44N after humidification and drying (which was enough hardness for practical use) although the solid milk was compaction molded under lower compaction pressure (1.5-1.8 MPa compared to 2.3 MPa) than Comparison Example 1. Furthermore, the hardness of the compaction molded body (uncured solid milk) in Example 1-3 was higher than Comparison Example 1 which was 3N. Namely, according to Example 1-3, the compaction molded body of powdered milk or solid milk having high hardness could be obtained in spite of high porosity. This is considered that the compaction moldability was enhanced due to high porosity of the powdered milk. Therefore, solid milk in Example 1-3 had excellent solubility by high porosity and grew easier to care with less fragility because of high hardness. As a result, it was found that solid milk in Example 1-3 was very suitable for practical use. Furthermore, according to Example 1-3, it was found that the higher the $CO_2$ mix ratio was, the higher the porosity of solid milk was, and then the higher the solubility was.

Figure 4:
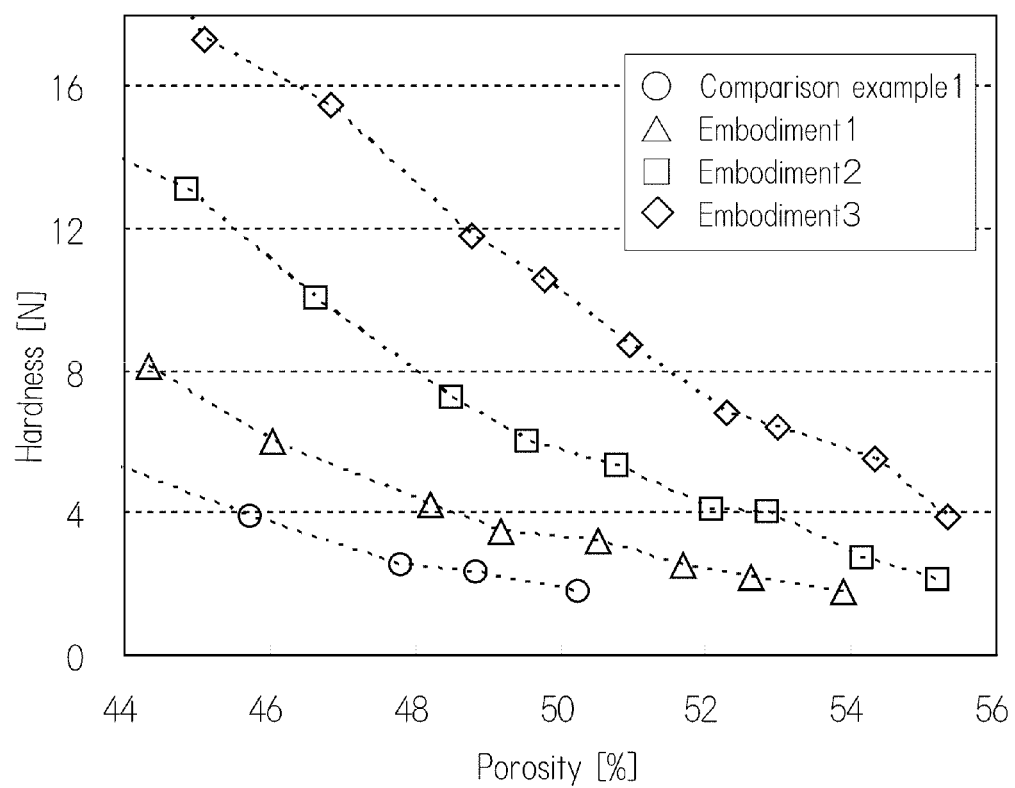
FIG. 4 shows a graph indicating a relationship between hardness and porosity (44 percents-56 percents) of a manufactured compaction molded body of powdered milk (uncured solid milk) by changing compaction pressure at compaction molding regarding to the solid milk of Example 1-3 and Comparison Example 1.

Furthermore, in order to verify whether solid milk having both the required porosity and hardness could be produced by changing compaction pressure at the time of compaction molding, inventors practically produced various kinds of solid milk from powdered milk of Example 1-3 and Comparison Example 1, and measured porosity and hardness of the solid milk. However, in this case only the compaction molding process was performed for manufacturing the solid milk. In other words, processes for enhancing hardness of the powdered milk after compaction molding (the humidification process and the drying process) were skipped in solid milk manufacture. Additionally, in this description, solid milk without having processes for enhancing hardness of solid milk thus is also called as compaction molded body of powdered milk or uncured solid milk. The result of this measurement is shown in Table 5 and FIG. 4. Table 5 shows a relationship between porosity and hardness in a compaction molded body of powdered milk manufactured by changing compaction pressure at the time of compaction molding regarding to the powdered milk of Example 1-3 and Comparison Example 1. FIG. 4 shows a relationship between porosity (44 percents-56 percents) and hardness in a compaction molded body of powdered milk produced by changing the pressure regarding to the powdered milk of Example 1-3 and Comparison Example 1.

TABLE 5

Table 5

| | | | | | | | | | | | | | | | | |
|---|---|---|---|---|---|---|---|---|---|---|---|---|---|---|---|---|
| Solid milk of comparison example1 | Porosity | [%] | 34 | 37 | 40 | 42 | 44 | 46 | 48 | 49 | 50 | | | | | |
| | Hardness | [N] | 26 | 17 | 10 | 6 | 5 | 4 | 3 | 2 | 2 | | | | | |
| Solid milk of embodiment1 | Porosity | [%] | 35 | 37 | 40 | 43 | 44 | 46 | 48 | 49 | 51 | 52 | 53 | 54 | | |
| | Hardness | [N] | 32 | 22 | 14 | 9 | 8 | 6 | 4 | 4 | 3 | 3 | 2 | 2 | | |
| Solid milk of embodiment2 | Porosity | [%] | 36 | 38 | 41 | 44 | 45 | 47 | 49 | 50 | 51 | 52 | 53 | 54 | 55 | |
| | Hardness | [N] | 44 | 32 | 22 | 14 | 13 | 10 | 7 | 6 | 5 | 4 | 4 | 3 | 2 | |
| Solid milk of embodiment3 | Porosity | [%] | 36 | 39 | 42 | 44 | 45 | 47 | 49 | 50 | 51 | 52 | 53 | 54 | 55 | 58 | 58 |
| | Hardness | [N] | 60 | 41 | 32 | 22 | 17 | 16 | 12 | 11 | 9 | 7 | 6 | 6 | 4 | 3 | 3 |

As shown in Table 5 and FIG. 4, various compactions molded bodies of powdered milk having different combination of the values of porosity and hardness could be manufactured by changing compaction pressure. Specifically, by increasing the compaction pressure, the compaction molded body of powdered milk having better hardness could be produced, while by decreasing the pressure, the compaction molded body of powdered milk having higher porosity could be produced. Furthermore, the compaction molded body of powdered milk having both suitable porosity and hardness, by adjusting middle between high compaction pressure and low compaction pressure, was found out capable of producing. In addition, the hardness shown in Table 5 and FIG. 4 indicates the compaction molded body of powdered milk without having processes for enhancing hardness, so that hardness of the compaction molded body is further enhanced by performing the humidification process and the drying process.

According to Table 5 and FIG. 4, compared the compaction molded bodies of powdered milk concerning Example 1-3 to the one concerning Comparison Example 1, hardness of compaction molded bodies of powdered milk concerning Example 1-3 (4N, 7N, 12N respectively) tended to be higher than the one concerning Comparison Example 1 (2N) in case of the same porosity (for example 49 percents). This was considered to show that the compaction molded bodies of powdered milk concerning Example 1-3 are superior to the one concerning Comparison Example 1 in terms of the compaction moldability.

This tendency was more obvious in the powdered milk manufacture when $CO_2$ mix ratio becomes higher. Thus, the higher the $CO_2$ mix ratio is, the more various compaction molded bodies of powdered milk with different combination of the values of porosity and hardness can be manufactured. For example, in case a compaction molded body of powdered milk having 20 N or more hardness is needed, in Example 3 ($CO_2$ mix ratio is 45 percents) porosity of the compaction molded body being subject to manufacturing could be selected between 36 percents-44 percents by only adjusting compaction pressure. On the other hand, in Comparison Example 1 ($CO_2$ mix ratio is 0 percent) porosity of the compaction molded body of powdered milk being subject to manufacturing remained around 34 percents, thus a range of option (latitude) was narrow, although compaction pressure was adjusted.

Furthermore, according to Table 5 and FIG. 4, compared the compaction molded bodies of powdered milk concerning Example 1-3 to the one concerning Comparison Example 1, porosity of compaction molded bodies of powdered milk concerning Example 1-3 (51-52 percents, 54 percents, 58 percents respectively) tended to be higher than the one concerning Comparison Example 1 (48 percents respectively) in case of the same hardness (for example 3N). This was considered to show that it was because the compaction molded bodies of powdered milk concerning Example 1-3 could be maintained many air gaps compared to the one concerning Comparison Example 1 if the both were under the same compaction pressure. It turned out that the higher the $CO_2$ mix ratio was, the more apparent the abovementioned tendency grew in powdered milk manufacturing.

Compared Example 1-3 to Comparison Example 1, the main difference is whether the gas dispersal process in powdered milk manufacturing or not. When the gas dispersal process was skipped like Comparison Example 1, compared to the gas dispersal process performed like Example 1-3, the average particle diameter of powdered milk became reduced in size, and porosity of solid milk was declined. However, although solid milk of Comparison Example 1 was inferior to Example 1-3, the solid milk of Comparison Example 1 had enough hardness and porosity for practical use. This reason was considered that it was because powdered milk having big average particle diameter was extracted (selected) at the classification process. Thus, inventors researched about the presence of classification process.

Specifically, cases of performing the classification process (abovementioned Example 1-3 and Comparison Example 1) were compared to cases of skipping the classification process (Example 4-6 and Comparison Example 2). Methods of manufacturing powdered milk or solid milk in Example 4-6 and Comparison Example 2 are the same except for skipping the classification process. Thus, these explanations are omitted.

Figure 5:
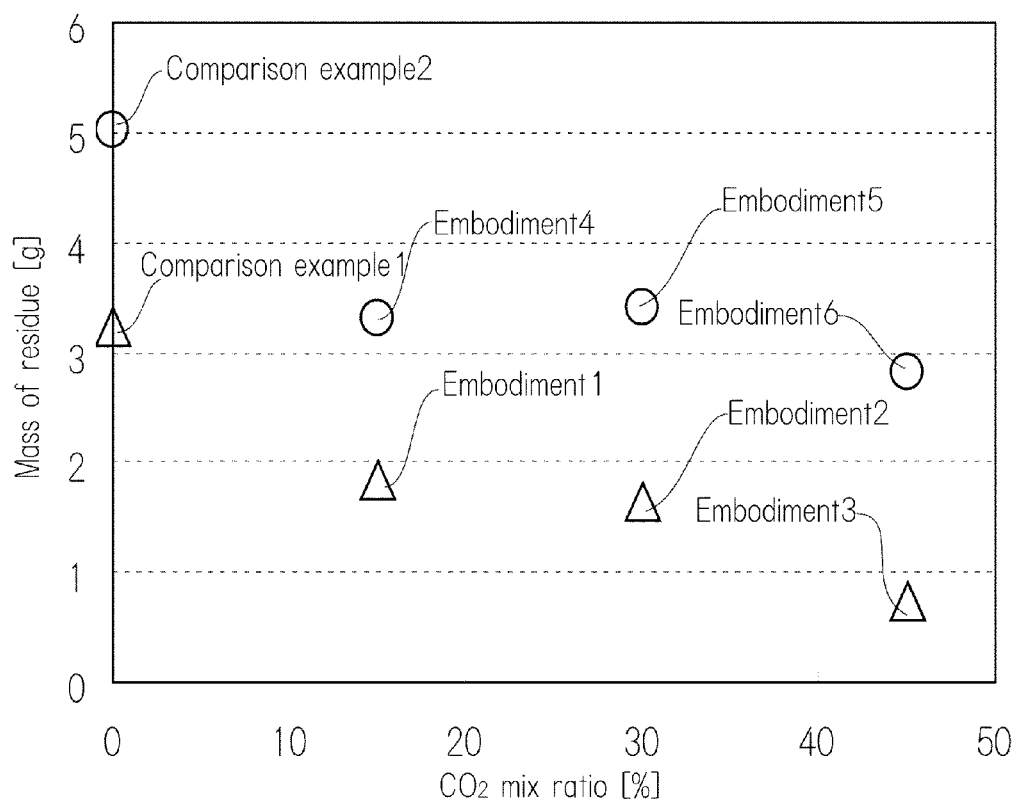
FIG. 5 shows a graph indicating a relationship between $CO_2$ mix rate [percent] at manufacturing powdered milk and mass of residue [g] in the second test method regarding to solid milk of Example 4-6 and Comparison Example 2.

Table 6 and FIG. 5 are illustrated by organising the evaluation results of Example 4-6 and Comparison Example 2 abovementioned.

Table 6 shows each measurement value of the solid milk in Example 4-6 and Comparison Example 2 and evaluation results of solubility. Further, average particle diameter of powdered milk in Example 4-6 and Comparison Example 2 indicated in Table 6 is corresponding to average particle diameter of powdered milk before the classification indicated in Table 2. Table 7 shows detail that results of solubility test are basic of overall judgement of solubility illustrated in Table 6. FIG. 5 shows a relationship between $CO_2$ mix rate [percent] at manufacturing powdered milk and mass of the residue [g] in the second test method in solid milk of Example 4-6 and Comparison Example 2. In addition, FIG. 5 also shows that the relationship in Example 1-3 and Comparison Example 1 (FIG. 3) for comparison.

TABLE 6

Table 6

| | Gas dispersing | Compaction molding | | Solid milk after molding, humidification and drying | | | | |
|---|---|---|---|---|---|---|---|---|
| | CO2 mix ratio [%] | Average particle diameter [μm] | Compaction pressure [MPa] | Thickness [mm] | Mass [g/piece] | Porosity [%] | Hardness [N] | Overall judgement of solubility |
| Comparison example2 | 0 | 263 | 2.7 | 12.4 | 5.6 | 45 | 52 | X |
| Embodiment4 | 15 | 295 | 2.2 | 13.4 | 5.6 | 49 | 45 | Δ |
| Embodiment5 | 30 | 308 | 2.2 | 14.0 | 5.6 | 51 | 45 | Δ |
| Embodiment6 | 45 | 321 | 1.8 | 15.0 | 5.6 | 55 | 39 | ⊚ |

TABLE 7

Table 7

|  | Solubility test | | | | |
|---|---|---|---|---|---|
|  | First test method | | | | Second test method Mass of |
|  | Test A [score] | Test B [score] | Test C [score] | Test D [score] | residue [g] |
| Comparison example2 | 0 | 2 | 2 | 3 | 5.0 |
| Embodiment4 | 0 | 1 | 2 | 3 | 3.3 |
| Embodiment5 | 0 | 0 | 2 | 4 | 3.4 |
| Embodiment6 | 0 | 0 | 1 | 2 | 2.8 |

Figure 6:
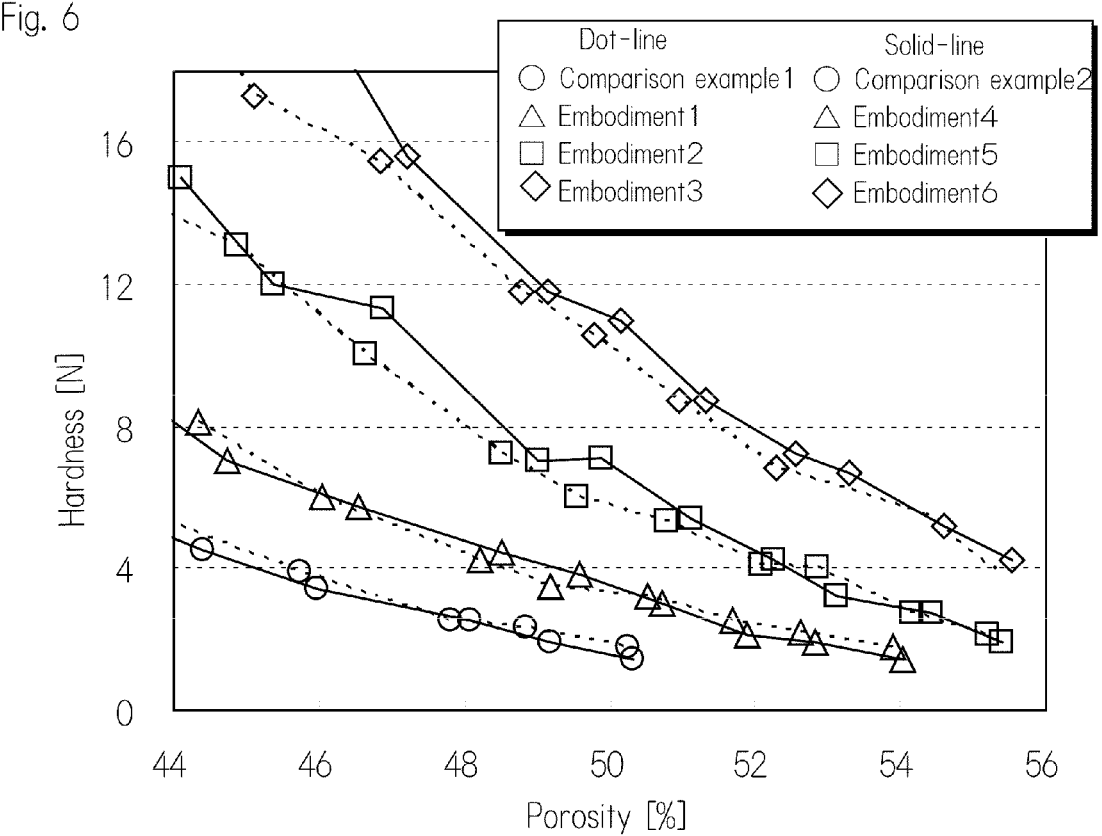
FIG. 6 is a graph for indicating a relationship between porosity (44 percents-56 percents) and hardness of compaction molded body of powdered milk (uncured solid milk) manufactured by changing compaction pressure at compaction molding regarding to the solid milk of Example 4-6 and Comparison Example 2. (The dotted line shows the hardness of compaction molded body of powdered milk compaction molded by using the classified powder, and the solid line shows the hardness of compaction molded body of powdered milk compaction molded by using the non classified powder.)

Furthermore, inventors measured hardness of compaction molded bodies of powdered milk after the compaction molded bodies of powdered milk having various porosities were manufactured by changing compaction pressure on the powdered milk in Example 4-6 and Comparison Example 2 at the time of compaction molding. Results of the measurement are shown in Table 8 and FIG. 6. Table 8 indicates a relationship between hardness and porosity of compaction molded body of powdered milk manufactured by changing compaction pressure regarding to the powdered milk in Example 4-6 and Comparison Example 2. FIG. 6 is a graph for indicating a relationship between porosity (44 percents-56 percents) and hardness of compaction molded body of powdered milk manufactured by changing compaction pressure regarding to Example 4-6 and Comparison Example 2. In addition, in FIG. 6, the relationship in Example 1-3 and Comparison Example 1 is indicated by dot line for comparison.

TABLE 8

Table 8

| Solid milk of comparison example2 | Porosity | [%] | 35 | 37 | 40 | 43 | 44 | 46 | 48 | 49 | 50 |  |  |  |  |  |
|---|---|---|---|---|---|---|---|---|---|---|---|---|---|---|---|---|
|  | Hardness | [N] | 23 | 16 | 10 | 6 | 5 | 3 | 3 | 2 | 1 |  |  |  |  |  |
| Solid milk of embodiment4 | Porosity | [%] | 36 | 38 | 41 | 43 | 45 | 47 | 49 | 50 | 51 | 52 | 53 | 54 |  |  |
|  | Hardness | [N] | 33 | 23 | 15 | 9 | 7 | 6 | 4 | 4 | 3 | 2 | 2 | 1 |  |  |
| Solid milk of embodiment5 | Porosity | [%] | 37 | 39 | 42 | 44 | 45 | 47 | 49 | 50 | 51 | 52 | 53 | 54 | 55 |  |
|  | Hardness | [N] | 46 | 35 | 22 | 15 | 12 | 11 | 7 | 7 | 5 | 4 | 3 | 3 | 2 |  |
| Solid milk of embodiment6 | Porosity | [%] | 37 | 39 | 42 | 44 | 46 | 47 | 49 | 50 | 51 | 53 | 53 | 55 | 56 | 58 | 59 |
|  | Hardness | [N] | 57 | 46 | 31 | 21 | 20 | 16 | 12 | 11 | 9 | 7 | 7 | 5 | 4 | 3 | 2 |

As shown in Table 8 and FIG. 6, various compactions molded bodies of powdered milk having different combination of the values of porosity and hardness could be manufactured by changing compaction pressure as well as the knowledge obtained by the Table 5 and FIG. 4. Also, porosity and hardness of the compaction molded bodies of powdered milk were not changed whether the classification process was performed or not as the result.

Furthermore, as shown in Table 7 and Table 4 if you compare, or as shown in FIG. 5, if the classification process was skipped like Example 4-6 and Comparison Example 2, solubility of the solid milk tended to become worse compared to the case through the process as in Example 1-3 and Comparison Example 1 regardless of $CO_2$ mix rate. In other words, performing the classification process like Example 1-3 and Comparison Example 1 was preferable in terms of solubility.

And, when solubility of solid milk in Comparison Example 2 was evaluated, in the second test method mass of residue was 5.0 g (over 4.5 g) which means over evaluation standard, 4.5 g. Therefore, in solid milk of Comparison Example 2 solubility was evaluated as very poor (X). Namely, solid milk of Comparison Example 2 was not suitable for practical use in terms of product quality. This means that powdered milk relating to Comparison Example 2 is not suitable for manufacturing solid milk. Thus according to Comparison Example 2, it was difficult to produce powdered milk that was suitable for manufacturing solid milk unless both the gas dispersal process and the classification process were performed. Also, according to the comparison of Comparison Example 1 and 2, suitable powdered milk for manufacturing solid milk could be produced even if the classification process was only performed.

Therefore, according to comparison of Example 1-3 and Example 4-6, by performing the gas dispersal process, suitable powdered milk for manufacturing solid milk could be obtained more certainly. Furthermore, according to Comparison Example 1 and Comparison Example 2, even if the classification process was only performed, solid milk having high solubility could be produced. Therefore, powdered milk which is obtained by spray drying and performing the gas dispersal process is suitable for manufacturing solid milk. Furthermore, solid milk having higher solubility can be manufactured by classifying and compaction molding the powdered milk, and by performing the humidification process and the drying process.

Nitrogen gas was used as a gas dispersed into concentrated gas at the gas dispersal process (S112) to compare the characteristics of the processes having the gas dispersal process (Example 7, 8) to the one of a process without the gas dispersal process (Comparison Example 3). Furthermore, in the gas dispersal process, an effect of differences (changes) of liquid milk density (bulk of powdered milk) was also researched by changing the proportion of the prescribed dispersed gas to liquid milk as the same as Example 1-3(Example 7, 8).

Example 7

In Example 7, powdered milk was manufactured as the same as Example 1 except for using nitrogen gas in the gas dispersal process. In this case mix ratio of nitrogen gas (hereinafter, referred to it as $N_2$ mix ratio [percent]) was 7 percents.

The powdered milk obtained from this method was bulkier than powdered milk in the comparison example as described below. The component of the obtained powdered milk 100 g comprised fats 18 g, proteins 15 g, carbohydrate 60 g, and other 7 g.

Example 8

In Example 8, powdered milk was manufactured as the same as Example 7 except for 450 percents of $N_2$ mix ratio.

The powdered milk obtained from this method was bulkier than powdered milk in the comparison example as described below. An analysis of manufactured powdered milk component carried out found that the component of the obtained powdered milk 100 g comprised fats 18 g, proteins 15 g, carbohydrate 60 g, and other 7 g.

Comparison Example 3

In Comparison Example 3, powdered milk was manufactured as the same as Example 7 except for 0 percents of $N_2$ mix rate in the gas dispersal process (in other words, the process was skipped). The result of component of the manufactured powdered milk was perfectly the same as the one in Example 7. Namely, the component of the obtained powdered milk 100 g comprised fats 18 g, proteins 15 g, carbohydrate 60 g, and other 7 g.

Figure 7:
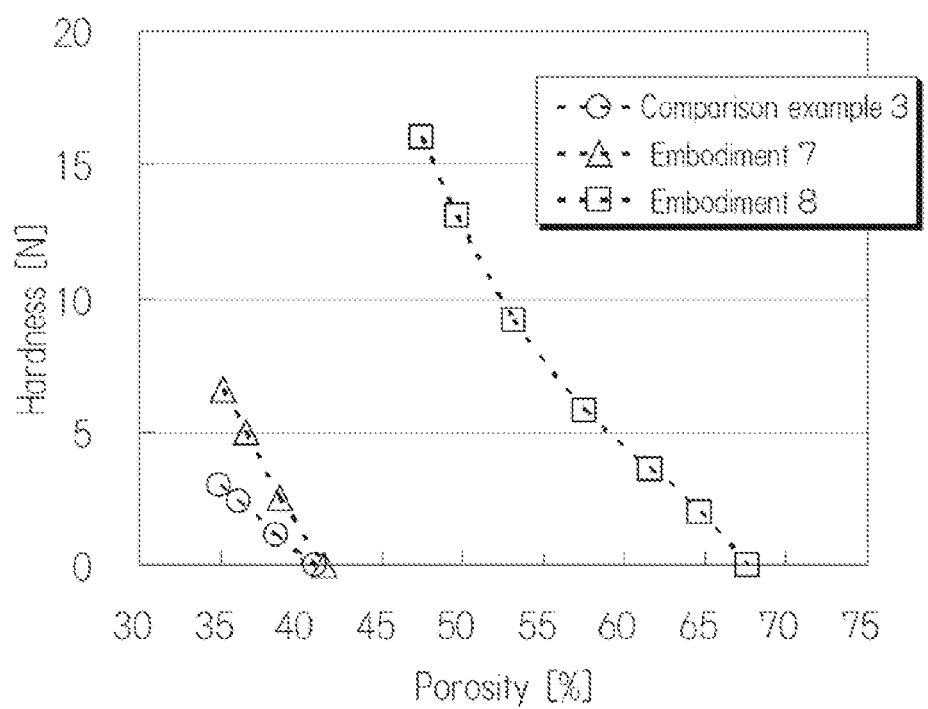
FIG. 7 shows a graph indicating a relationship between hardness and porosity (30 percents-75 percents) of a manufactured compaction molded body of powdered milk (uncured solid milk) by changing compaction pressure at compaction molding regarding to the solid milk of Example 7, 8 and Comparison Example 3.

In Example 7, 8 and Comparison Example 3 solid milk was manufactured as the same as Example 1. The powdered milk was prepared to make a rectangular parallelepiped as an outward form by the abovementioned single-punch tableting machine. Amount of usage of powdered milk was adjusted to be 5.6 g of solid milk per piece after the compaction molding process. In order to verify whether solid milk could have the required hardness as well by changing compaction pressure in compaction molding, inventors substantially produced various kinds of solid milk from powdered milk and measured porosity and hardness of the solid milk. However, only the compaction molding process was performed for manufacturing the solid milk here. In other words, processes for enhancing hardness of the solid milk after compaction molding (the humidification process and the drying process) were skipped in solid milk manufacture. The result of measurement is shown in Table 9 and FIG. 7. Table 9 shows a relationship between porosity and hardness in a compaction molded body of powdered milk manufactured by changing compaction pressure at the time of compaction molding regarding to the powdered milk of Example 7, 8 and Comparison Example 3. FIG. 7 shows a relationship between porosity (30 percents-75 percents) and hardness in a compaction molded body of powdered milk produced by changing compaction pressure at the time of compaction molding regarding to the solid milk of Example 7, 8 and Comparison Example 3.

TABLE 9

| Table 9 | | | | | | | | | |
|---|---|---|---|---|---|---|---|---|---|
| Solid milk of comparison example3 | Porosity | [%] | 35 | 36 | 38 | 41 | | | |
| | Hardness | [N] | 3 | 2 | 1 | 0 | | | |
| Solid milk of embodiment7 | Porosity | [%] | 35 | 37 | 39 | 41 | | | |
| | Hardness | [N] | 7 | 5 | 3 | 0 | | | |
| Solid milk of embodiment8 | Porosity | [%] | 48 | 50 | 53 | 58 | 62 | 65 | 68 |
| | Hardness | [N] | 16 | 13 | 9 | 6 | 4 | 2 | 0 |

As shown in Table 9 and FIG. 7, various compactions molded bodies of powdered milk having different combination of the values of porosity and hardness could be manufactured by changing compaction pressure.

Also, according to Table 9 and FIG. 7, as compared the compaction molded bodies of powdered milk concerning Example 7 and 8 to the one concerning Comparison Example 3, in case of the same porosity (for example 35 percents), hardness of compaction molded bodies of powdered milk concerning Example 7 (7 N) tended to be higher than the one concerning Comparison Example 3 (1 N). In Example 8, in higher porosity than Comparison Example 3, hardness was also higher than Comparison Example 3. This was considered to show that the compaction molded bodies of powdered milk concerning Example 7 and 8 were superior to the one concerning Comparison Example 3 in respect of compaction molding.

This tendency was more obvious in the powdered milk manufacture when $N_2$ mix ratio became higher as a result. Thus, the higher the $N_2$ mix ratio is, the more various compaction molded bodies of powdered milk having different combination of the values of porosity and hardness can be manufactured. For example, when a compaction molded body of powdered milk having 3 N or more hardness was needed, in Example 8 ($N_2$ mix ratio is 450 percents) porosity of the compaction molded body being subject to manufacturing could be selected between 48 percents-62 percents by only adjusting compaction pressure. On the other hand, in Comparison Example 3 ($N_2$ mix ratio is 0 percents) porosity of the compaction molded body of powdered milk being subject to manufacturing was no more than around 35 percents, thus a range of option was narrow, although compaction pressure was adjusted.

Furthermore, according to Table 9 and FIG. 7, as compared the compaction molded bodies of powdered milk concerning Example 7, 8 to the one concerning Comparison Example 3, porosity of compaction molded bodies of powdered milk concerning Example 7, 8 (39 percents, 63 percents respectively) tended to be higher than the one concerning Comparison Example 3 (35 percents) in case of the same hardness (for example 3N). This was considered to show that it was because the compaction molded bodies of powdered milk concerning Example 7 and 8 could be maintained more air gaps compared to the one concerning Comparison Example 3 if under the same compaction pressure. This tendency was more obvious in the powdered milk manufacture when $N_2$ mix ratio became higher.

Here, as compared Example 1-3 and Comparison Example 1 to Example 7, 8 and Comparison Example 3, it was not changed that the more hardness and porosity could be widely selected by changing the compaction pressure, the higher the gas mix rate was if the gas to disperse in the gas dispersal process differed. In addition, in these examples and comparison examples powdered milk having the same components was used. Therefore, inventors researched by using powdered milk having different components.

Specifically, powdered milk having different components from Example 7, 8 and Comparison Example 3, which comprised fats 26 g, proteins 12 g, carbohydrate 57 g, and other 5 g per powdered milk 100 g (hereinafter referred it as powdered milk B). Then, in case of using powdered milk at Example 7, 8 and Comparison Example 3 (hereinafter referred it as powdered milk A) and in case of using powdered milk B (Example 9, 10 and Comparison Example 4) were compared. Methods of manufacturing powdered milk and solid milk in Example 9, 10 and Comparison Example 4 are the same as Example 7, 8 and Comparison Example 3 except for using different component powdered milk. Thus, these explanations are omitted.

Example 9

In Example 9, powdered milk was manufactured as the same as Example 7. In this case $N_2$ mix ratio was 6 percents. The powdered milk obtained from this method was bulkier than powdered milk in the comparison example as described below. An analysis of manufactured powdered milk component carried out found that the component of the obtained powdered milk was the same as the powdered milk B.

Example 10

In Example 10, powdered milk was manufactured as the same as Example 9 except for 270 percents of $N_2$ mix ratio. The powdered milk obtained from this method was bulkier than powdered milk in the comparison example as described below. An analysis of manufactured powdered milk component carried out found that the component of the obtained powdered milk was the same as the powdered milk B.

Comparison Example 4

In Comparison Example 4, powdered milk was manufactured as the same as Example 9 except for 0 percent of $N_2$ mix rate in the gas dispersal process (in other words, the process was skipped). The result of component of the manufactured powdered milk was perfectly the same as the powdered milk B. Namely, the component of the obtained powdered milk 100 g comprised fats 26 g, proteins 12 g, carbohydrate 57 g, and other 5 g.

Figure 8:
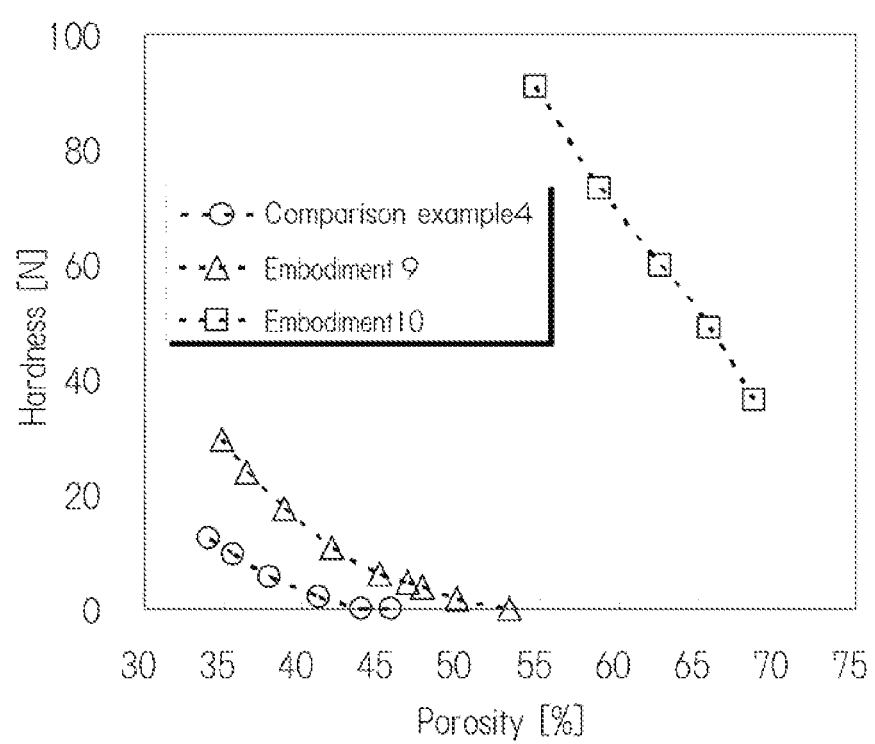
FIG. 8 shows a graph indicating a relationship between hardness and porosity (30 percents-75 percents) of a manufactured compaction molded body of powdered milk (uncured solid milk) by changing compaction pressure at compaction molding regarding to the solid milk of Example 9, 10 and Comparison Example 4.

And in Example 9, 10 and Comparison Example 4 solid milk was also manufactured as the same as Example 7. The powdered milk was prepared to make a rectangular parallelepiped as an outward form by the abovementioned single-punch tableting machine. Amount of usage of powdered milk was adjusted to 5.4 g of solid milk per piece after the compaction molding process. In order to verify whether solid milk could have the required hardness as well by changing compaction pressure in compaction molding, inventors actually produced individual solid milk from powdered milk of Example 9, 10 and Comparison Example 4, and they measured porosity and hardness of the solid milk. However, only the compaction molding process was performed here for manufacturing the solid milk. In other words, processes for enhancing hardness of the powdered milk after compaction molding (the humidification process and the drying process) were skipped in solid milk manufacture. The result of measurement is shown in Table 10 and FIG. 8. Table 10 shows a relationship between porosity and hardness in a compaction molded body of powdered milk manufactured by changing compaction pressure at the time of compaction molding regarding to the powdered milk of Example 9, 10 and Comparison Example 4. FIG. 8 shows a relationship between porosity (30 percents-75 percents) and hardness in a compaction molded body of powdered milk produced by changing compaction pressure at the time of compaction molding regarding to the powdered milk of Example 9, 10 and Comparison Example 4.

TABLE 10

| | | | | | | | | | | | |
|---|---|---|---|---|---|---|---|---|---|---|---|
| Solid milk of comparison example4 | Porosity | [%] | 34 | 36 | 38 | 41 | 44 | 46 | | | |
| | Hardness | [N] | 12 | 10 | 6 | 2 | 0 | 0 | | | |
| Solid milk of embodiment 9 | Porosity | [%] | 35 | 36 | 39 | 42 | 45 | 47 | 48 | 50 | 53 |
| | Hardness | [N] | 29 | 24 | 17 | 11 | 6 | 5 | 4 | 2 | 0 |
| Solid milk of embodiment10 | Porosity | [%] | 55 | 59 | 63 | 66 | 69 | | | | |
| | Hardness | [N] | 91 | 73 | 60 | 49 | 36 | | | | |

As shown in Table 10 and FIG. 8, similarly to the knowledge obtained from Table 9 and FIG. 7, various compaction molded bodies of powdered milk having different combination of the values of porosity and hardness could be manufactured by changing compaction pressure. Also, similarly to the knowledge obtained from Table 9 and FIG. 7, although component of powdered milk was changed, the higher the gas mix rate was, the more various hardness and porosity could be selected by changing compaction pressure.

In other words, from a comparison of Example 7, 8 and Example 9, 10, it was found that the higher the gas mix rate was, the more various hardness and porosity could be selected by changing compaction pressure regardless of powdered milk components.

As explained in detail above, according to the examples, by performing the gas dispersal process or the classification process at the time of powdered milk manufacturing, it was found out that an extensive advantage (merit), which enabled the solid milk with both high porosity and hardness to be easily produced, could be brought to powdered milk or solid milk manufacturer.

INDUSTRIAL APPLICABILITY

The present invention can be applied to the dairy industry, the dairy farming, powder manufacturing industry or solid manufacturing industry since the invention refers to the method for manufacturing solid milk from powdered milk.

The invention claimed is:
1. A method for manufacturing solid milk, comprising:
   dispersing a gas into a liquid milk by injecting the gas at a pressure of 1.5 atm to 10 atm,
   wherein the gas is carbon dioxide, wherein a ratio of a volume flow of the gas to a volume flow of the liquid milk is 0.15 to 0.45,
   wherein the liquid milk is a concentrated milk having a water content of 35-60% by mass,
   wherein the liquid milk after dispersing the gas has a volume 1.1 to 2 times larger than a volume of the liquid milk before dispersing the gas;
   spray-drying the liquid milk containing the dispersal gas to obtain powdered milk,
   wherein the spray-drying is performed within 0.1 to 5 seconds after injecting the gas, and wherein the resultant powdered milk has a free fat content of 0.5 to 4% by mass; and
   compacting the powdered milk in a mold with a compacting force of 1 to 30 MPa, wherein the resultant compaction molded body has a porosity of 30 to 60%.
2. The method according to claim 1, further comprising, before compacting the powdered milk:
   sieving the powdered milk using a sieve; and
   collecting the powdered milk remaining on the sieve,
   wherein the powdered milk remaining on the sieve has particle diameters larger than a mesh size of the sieve, and wherein compacting the powdered milk is performed by compacting the powdered milk remaining on the sieve.

3. The method according to claim 2, wherein the particle diameters of the powdered milk remaining on the sieve are at least 355 micrometers.

4. The method according to claim 1, further comprising, after compacting the powdered milk:
adding 0.5 to 3% by mass of moisture to the compaction molded body by humidifying the compaction molded body; and
drying the humidified compaction molded body to obtain solid milk, wherein the resultant solid milk has a porosity of 30 to 60% and a hardness of 40 to 60 N.

5. The method according to claim 1,
wherein the gas is carbon dioxide,
wherein a ratio of a volume flow of the gas to a volume flow of the liquid milk is 0.15 to 0.45, and
wherein the porosity of the resultant compaction molded body is 44 to 56%.

6. The method according to claim 1, wherein the liquid milk is concentrated whole milk.

7. The method according to claim 1, wherein the compaction molded body has a hardness of 6 to 22 N.

8. A method for manufacturing solid milk, comprising:
dispersing a gas into liquid milk by injecting the gas at a pressure of 1.5 to 10 atm,
wherein the gas is carbon dioxide,
wherein the liquid milk is concentrated milk having a water content of 35 to 60% by mass,
wherein a ratio of a volume flow of the gas to a volume flow of the liquid milk is 0.15 to 0.45, and
wherein the liquid milk after dispersing the gas has a volume 1.1 to 2 times larger than a volume of the liquid milk before dispersing the gas;
spray-drying the liquid milk containing the dispersed gas to obtain powdered milk,
wherein the spray-drying is performed within 0.1 to 5 seconds after injecting the gas, and
wherein the resultant powdered milk has a free fat content of 0.5 to 4% by mass;
sieving the powdered milk using a sieve;
collecting the powdered milk remaining on the sieve,
wherein the powdered milk remaining on the sieve has particle diameters larger than a mesh size of the sieve;
compacting the powdered milk remaining on the sieve in a mold with a compacting force of 1 to 30 MPa,
wherein the resultant compaction molded body has a porosity of 44 to 56%,
adding 0.5 to 3% by mass of moisture to the compaction molded body by humidifying the compaction molded body; and
drying the humidified compaction molded body to obtain solid milk,
wherein the resultant solid milk has a porosity of 44 to 56% and a hardness of 40 to 60 N.

9. The method according to claim 8, wherein the particle diameters of the powdered milk remaining on the sieve are at least 355 micrometers.

10. The method according to claim 9, wherein the liquid milk is concentrated whole milk.

* * * * *